(12) United States Patent
Ishikawa et al.

(10) Patent No.: US 7,701,109 B2
(45) Date of Patent: Apr. 20, 2010

(54) ROTATING ELECTRICAL MACHINE

(75) Inventors: Toshio Ishikawa, Hitachinaka (JP); Minoru Yabuki, Tokai (JP); Hiroshi Kanazawa, Hitachiota (JP); Yuji Enomoto, Hitachi (JP); Yoshihisa Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 11/950,595

(22) Filed: Dec. 5, 2007

(65) Prior Publication Data
US 2008/0136272 A1 Jun. 12, 2008

(30) Foreign Application Priority Data
Dec. 7, 2006 (JP) .............................. 2006-330098

(51) Int. Cl.
*H02K 1/14* (2006.01)
(52) U.S. Cl. ...................................... 310/257; 310/263
(58) Field of Classification Search .................... 310/43, 310/49 R, 216, 254, 257, 263, 91, 217
See application file for complete search history.

(56) References Cited

U.S. PATENT DOCUMENTS

| | | | | |
|---|---|---|---|---|
| 4,695,419 A | * | 9/1987 | Inariba | 264/259 |
| 5,121,017 A | * | 6/1992 | Yamamoto et al. | 310/49 R |
| 5,828,145 A | * | 10/1998 | Nakamura | 310/67 A |
| 6,031,304 A | * | 2/2000 | Suzuki et al. | 310/49 R |
| 6,060,800 A | * | 5/2000 | Suzuki et al. | 310/49 R |
| 6,486,576 B1 | * | 11/2002 | Yura et al. | 310/49 R |
| 6,822,351 B2 | * | 11/2004 | Matsushita et al. | 310/49 R |
| 6,909,208 B2 | * | 6/2005 | Suzuki et al. | 310/49 R |
| 7,199,500 B2 | * | 4/2007 | Yoshida | 310/257 |

(Continued)

FOREIGN PATENT DOCUMENTS

JP 2-159949 6/1990

(Continued)

OTHER PUBLICATIONS

U.S. Appl. No. 11/781,065, filed Jul. 20, 2007, Yuji Enomoto.

(Continued)

*Primary Examiner*—Tran N Nguyen
(74) *Attorney, Agent, or Firm*—Antonelli, Terry, Stout & Kraus, LLP.

(57) ABSTRACT

It is an object of the present invention to make it possible to easily wind a stator winding, enhance an occupied ratio in a stator core, reduce a winding resistance because there is no coil end, and change a field magnetic flux in accordance with a use.

Stator pawl magnetic poles of a stator core extend from both sides in an axial direction alternately at locations opposed to a rotor to form a plurality of magnetic poles. With this stator core, it is only necessary to annularly wind a stator winding. Therefore, it is possible to enhance operability and an occupied ratio, and since there is no coil end, it is possible to reduce winding resistance. Since the rotor is a Randall type rotor having a field winding and a rotor pawl magnetic pole, it is possible to change the field magnetic flux in accordance with a use.

20 Claims, 20 Drawing Sheets

U.S. PATENT DOCUMENTS

2003/0030345 A1    2/2003    Enomoto et al.
2007/0075605 A1    4/2007    Enomoto et al.
2007/0145854 A1    6/2007    Enomoto et al.

FOREIGN PATENT DOCUMENTS

JP    2004-15998    1/2004

OTHER PUBLICATIONS

U.S. Appl. No. 11/782,077, filed Jul. 24, 2007, Yuji Enomoto, et al.
U.S. Appl. No. 11/763,481, filed Jun. 5, 2007, Yuji Enomoto.
U.S. Appl. No. 11/782,074, filed Jul. 24, 2007, Masashi Kitamura, et al.

* cited by examiner

Electrical angle 120°
Electrical angle 120°

17
17W
17V
17U

17V

Electrical angle 120°
Electrical angle 120°

17U   17W

ROTATING ELECTRICAL MACHINE

BACKGROUND OF THE INVENTION

1. Field of the Invention

The present invention relates to a rotating electrical machine such as a power generator and a motor.

2. Description of the Related Art

A general stator used for a power generator or a motor includes a stator core having an inner peripheral surface from which a plurality of slots are opened in a circumferential direction, and a plurality of stator windings which are respectively wound around the slots. Thus, there are problems that an operation for winding the stator winding into the slot having a narrow width, the operability is inferior and a ratio of an area of the stator winding occupying in the slot can not be increased.

Hence, as shown in Japanese Patent Application Laid-open No. 2004-15998, there is proposed a rotating electrical machine in which the stator core includes stator pawl magnetic poles alternately extending from axially both sides of a portion of the stator opposed to the rotor, and a stator winding is annularly wound around the outer periphery of the rotor. If such a stator is employed, the operability when winding the stator winding is enhanced, and a rate of area of the stator core occupied by the stator winding can be enhanced.

SUMMARY OF THE INVENTION

However, according to the Japanese Patent Application Laid-open No. 2004-15998, since a permanent magnet is used in the rotor for forming a magnetic pole, the field magnetic flux can not be changed in accordance with the revolution number. Therefore, there is a problem that the field magnetic flux is generated even when it is not required.

It is an object of the present invention to provide a rotating electrical machine in which a stator winding can be easily wound around the stator core.

According to the rotating electrical machine of the present invention, the rotor includes a field winding wound around a rotation shaft, and a rotor core which surrounds the field winding and which includes a rotor pawl magnetic pole at a portion of the rotor opposed to a pawl magnetic pole of the stator core, and the stator includes a stator winding which is annularly wound around an outer periphery of the rotor, and a stator core which includes stator pawl magnetic poles alternately extending from axially both sides of a portion of the stator opposed to the rotor, and which surrounds a periphery of the stator winding.

The rotating electrical machine of the invention includes a Randall type rotor having a field winding and 12 to 24 magnetic poles, and a stator including a stator core provided at a location opposed to an outer periphery of the rotor and a stator winding wound in the stator core, the stator winding being annularly wound around the outer periphery of the rotor, and the stator core including stator pawl magnetic poles extending from both sides in the axial direction at locations opposed to the rotor.

The rotating electrical machine of the invention includes a Randall type rotor having a field winding and a plurality of rotor pawl magnetic poles, and a stator including a stator core provided at a location opposed to an outer periphery of the rotor and a stator winding wound in the stator core, the stator winding being annularly wound around the outer periphery of the rotor, the stator core including stator pawl magnetic poles extending from both sides in the axial direction at locations opposed to the rotor, and a width of the stator pawl magnetic pole at a substantially center position in the axial direction/a width of a gap between the stator pawl magnetic poles is in a range of 0.05 to 0.3.

According to the rotating electrical machine of the present invention, since the stator winding is annularly wound, it is possible to easily wind the stator winding. Since the rotor includes a field winding, the field magnetic flux can be changed.

DESCRIPTION OF THE PREFERRED EMBODIMENTS

First Embodiment

Figure 1:
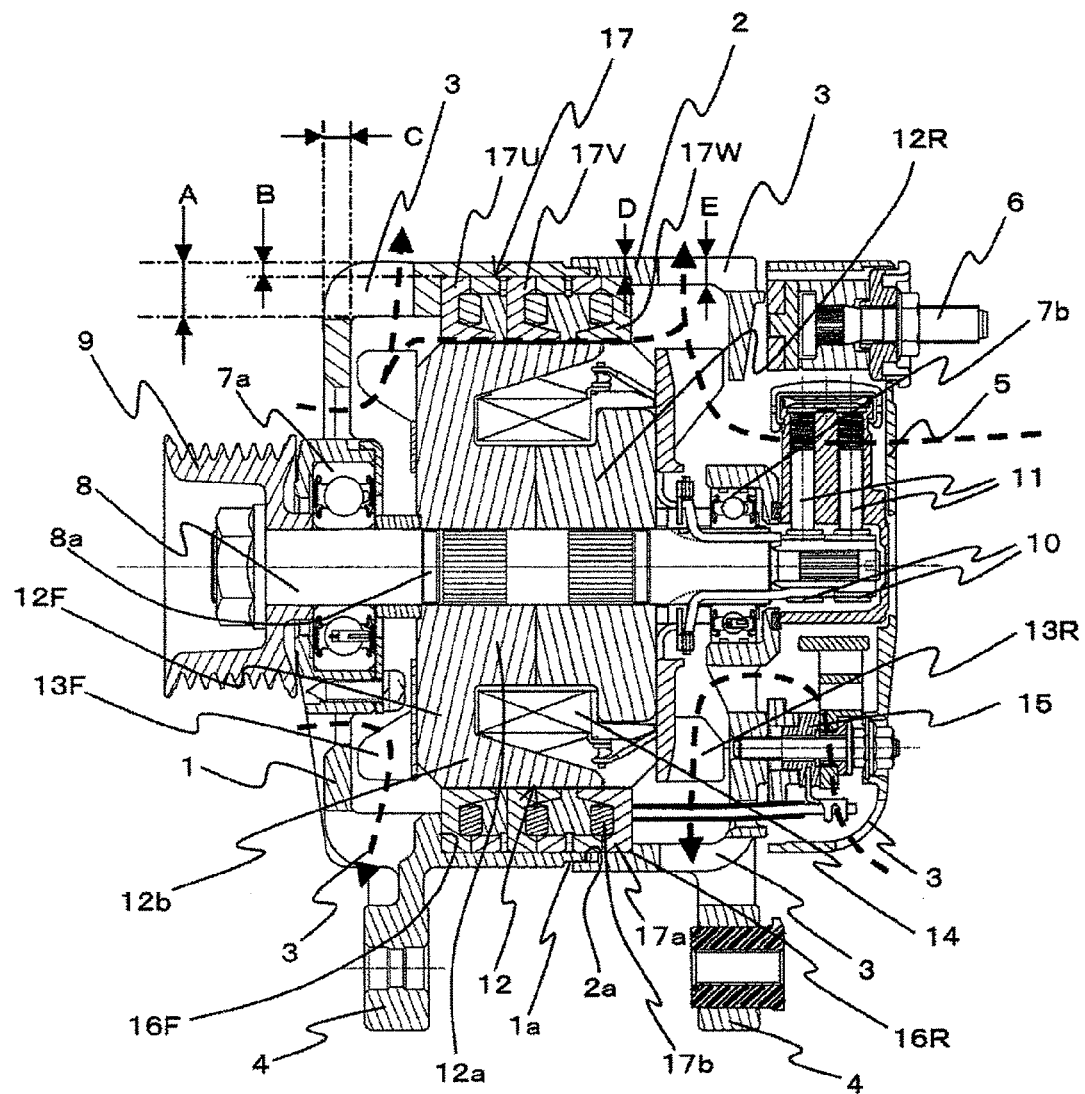
FIG. 1 is a side sectional view of a vehicular AC power generator as one embodiment of a rotating electrical machine.
Figure 2:
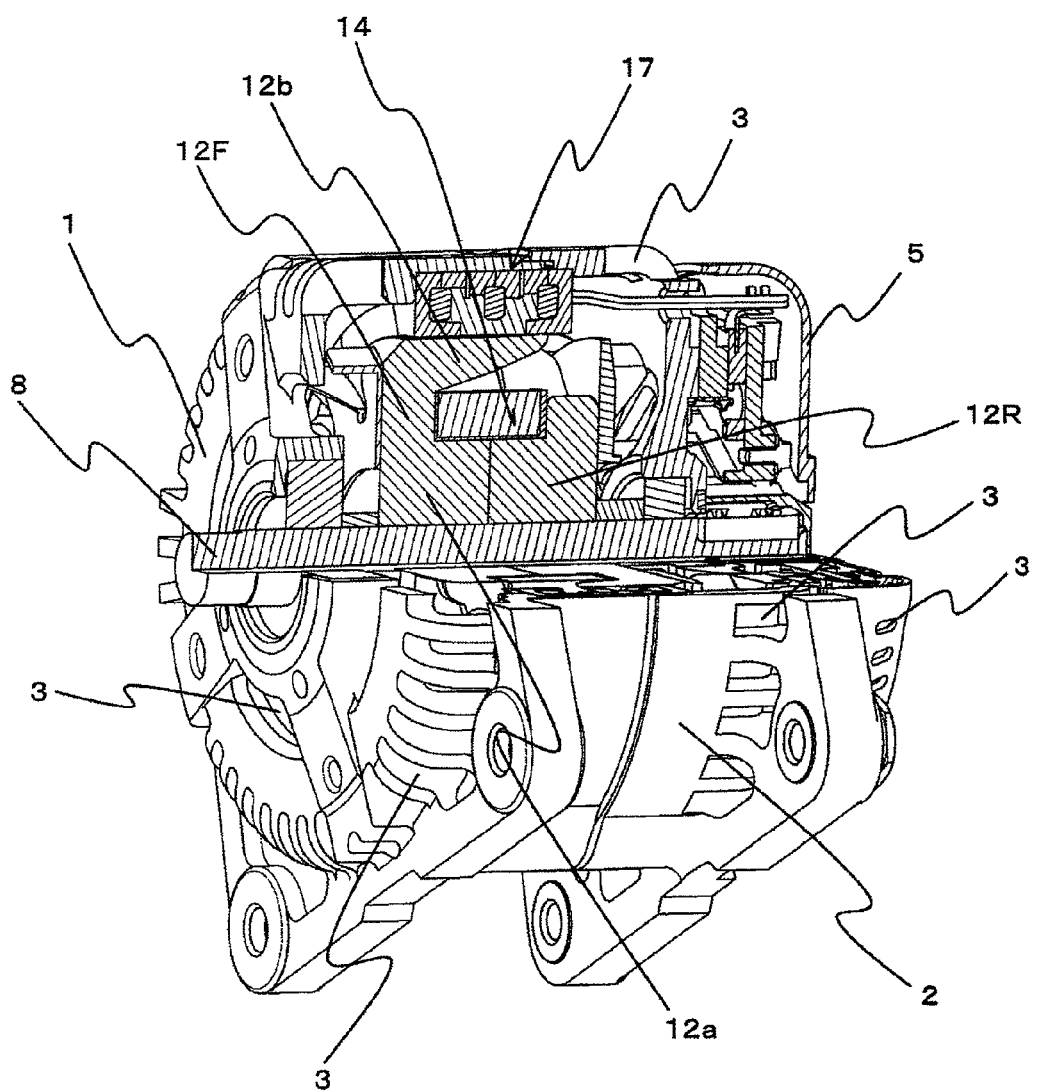
FIG. 2 is a partially sectional perspective view of the vehicular AC power generator as the one embodiment of the rotating electrical machine.
Figure 3:
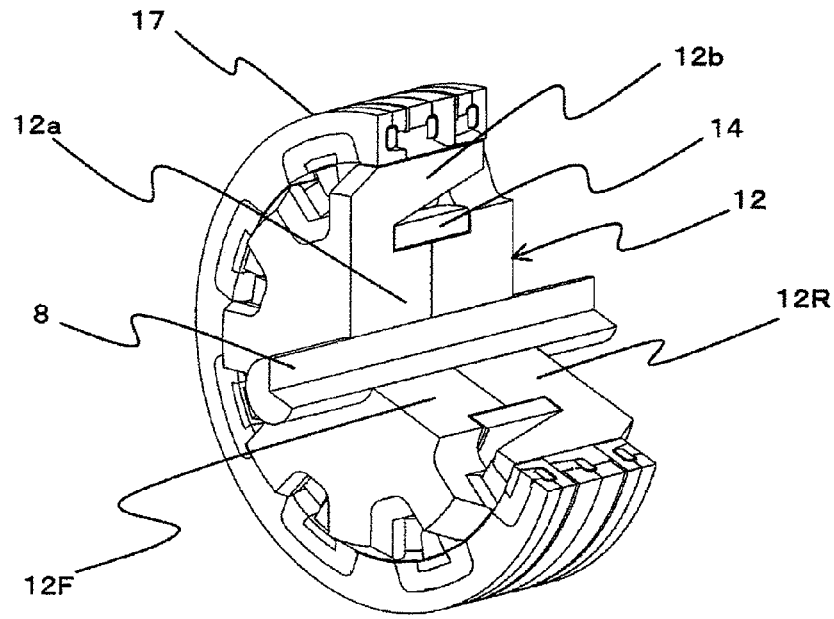
FIG. 3 is a partially sectional perspective view of a rotor and a stator.
Figure 4:
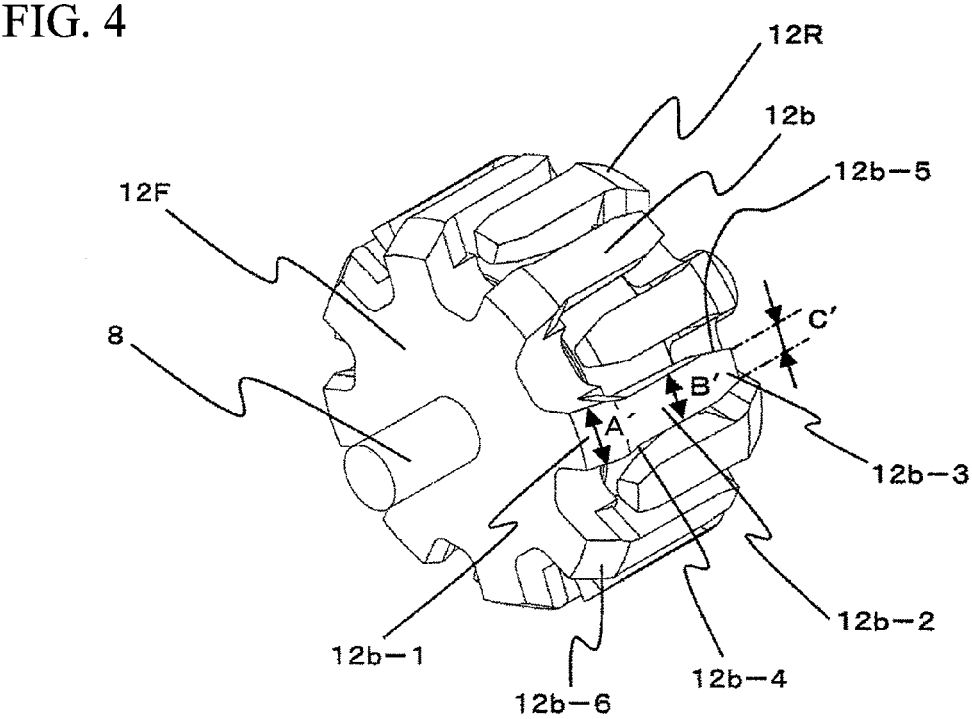
FIG. 4 is a perspective view of the rotor.
Figure 5A:
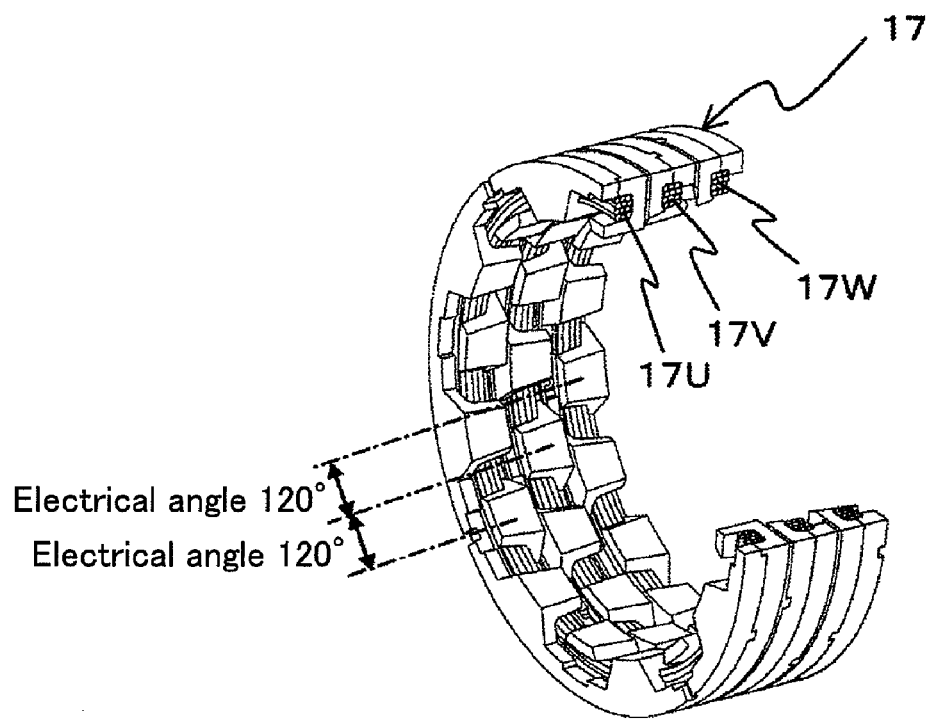
FIGS. 5A and 5B are a partially sectional perspective view of only the stator, and a diagram of the stator as viewed from the inner periphery.
Figure 5B:
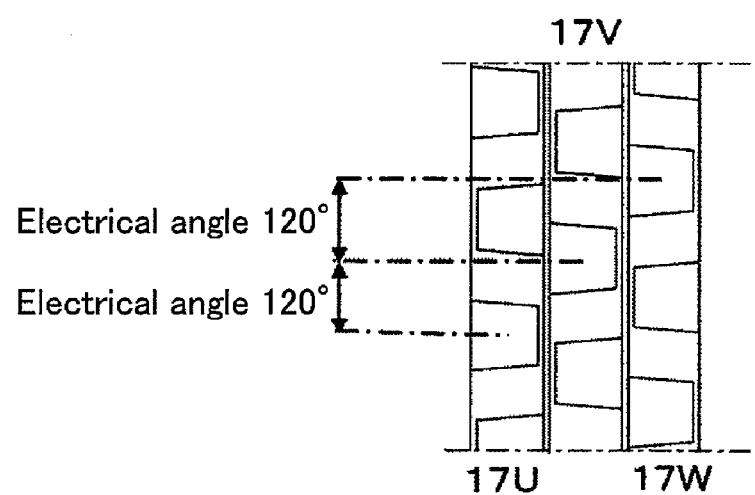
Figure 6:
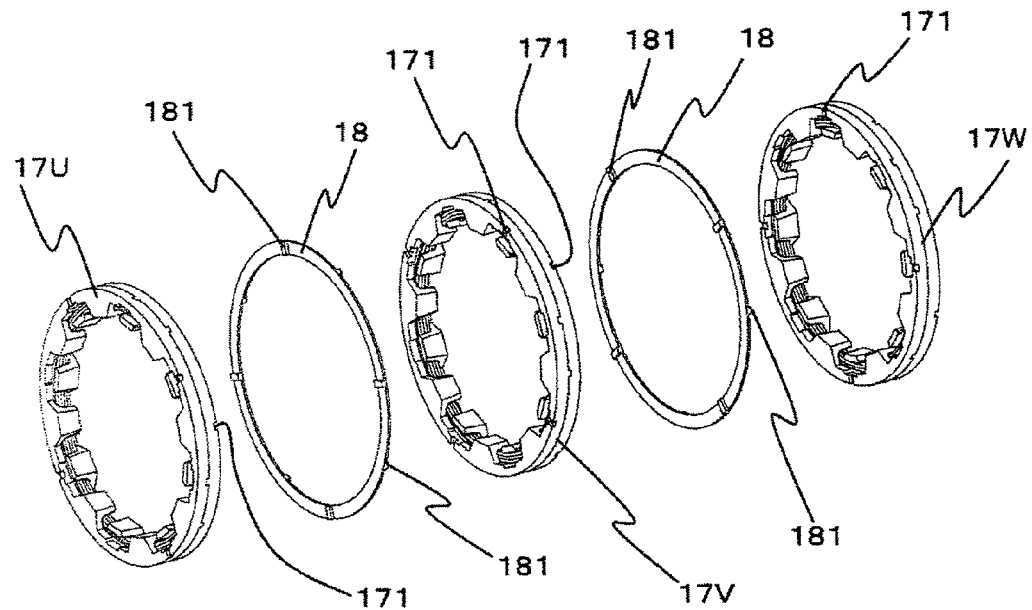
FIG. 6 is a perspective view of phases of the stator.
Figure 7A:
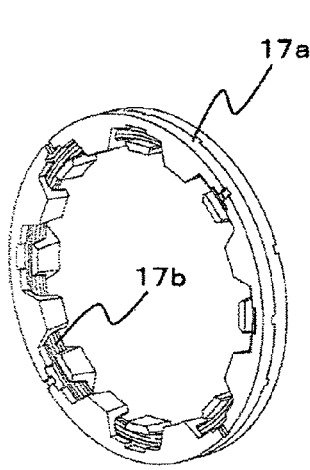
FIGS. 7A and 7B are a perspective view of the stator from which one phase is taken out, and a perspective view of parts.
Figure 7B:
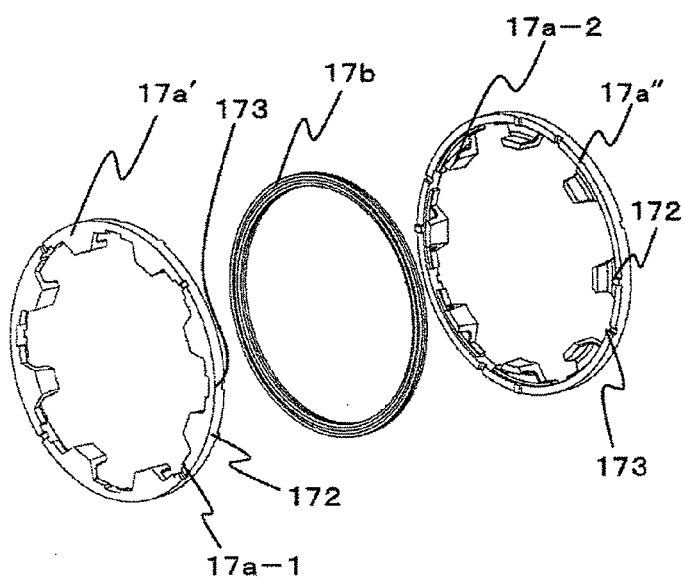

A vehicular AC power generator which is one embodiment of the rotating electrical machine according to the present invention will be explained based on FIGS. 1 to 7. FIG. 1 is a side sectional view of the vehicular AC power generator. FIG. 2 is a partially cross sectional perspective view of the vehicular AC power generator. FIG. 3 is a partially sectional perspective view of a rotor and a stator. FIG. 4 is a perspective view of the rotor. FIG. 5A is a partially sectional perspective view of the stator only. FIG. 5B is a diagram showing the stator as viewed from its inner peripheral side. FIG. 6 is a perspective view of each phase of the stator. FIG. 7A is a perspective view of the stator from which one of the phases. FIG. 7B is a perspective view of the parts shown in FIG. 7A.

FIG. 1 shows a vehicular AC power generator of the embodiment. The vehicular AC power generator includes a front bracket 1 disposed on the left side in FIG. 1 and a rear bracket 2 disposed on the left side in FIG. 1. Each bracket has a bottomed cylindrical shape having an accommodation space therein, i.e., a cup-like shape. A plurality of ventilation holes 3 are opened at an inner periphery of the front bracket 1 and an outer periphery of the rear bracket 2 as shown in FIG. 2. Air flows through the ventilation holes 3.

If a thickness of the front bracket 1 on radially outer peripheral side closer to the rear bracket 2 is defined as thickness A and thickness of the front bracket 1 on radially outer peripheral side closer to the bottom is defined as thickness B, a relation A>B is established. A fitting portion 1a including an annular step to which the rear bracket 2 can be fitted is formed on an outer periphery of an end on the side of the rear bracket 2. A thickness C of the front bracket 1 on the side of the end in the axial direction has a relation of thickness A>thickness C>thickness B.

In the radially outer peripheral side of the rear bracket 2 also, like the front bracket 1, a thickness D on the side of the front bracket 1 is smaller than a thickness E on the side of the bottom, and a fitting portion 2a including an annular step is formed on an inner periphery of the end of the thickness D. The step 1a of the front bracket 1 can be fitted to the fitting portion 2a. The thickness E of the rear bracket 2 is thicker than the thickness B of the front bracket 1.

In addition, fixing portions 4 are integrally provided on the front bracket 1 and the rear bracket 2, respectively so as to project radially outwardly. Fixing holes are opened at the fixing portions 4. The fixing portions 4 are mounted on a vehicle by bolts (not shown). The front bracket 1 and the rear bracket 2 are made of aluminum alloy, and die casting is used as a forming method.

A rear cover 5 which is thinner than the brackets is mounted on an end of the rear bracket 2 in its axial direction. Like the brackets, the rear cover 5 has a bottomed cylindrical shape having an accommodation space therein, i.e., a cup-like shape. A plurality of ventilation holes 3 are also opened at an inner periphery and an outer periphery of the rear cover 5. Air flows through the ventilation holes 3. A terminal 6 connected to a battery is mounted on the outer periphery of the rear cover 5. The rear cover 5 is made of resin or aluminum alloy.

Ball bearings 7a and 7b as bearings are respectively mounted substantially radially center positions of outer ends of the front bracket 1 and the rear bracket 2 in the axial direction. The ball bearing 7a mounted on the front bracket 1 has a diameter greater than that of the ball bearing 7b mounted on the rear bracket 2.

A shaft 8 is inserted through inner wheels of the ball bearings 7a and 7b, and the shaft 8 is relatively rotatably supported with respect to the front bracket 1 and the rear bracket 2.

A pulley 9 as a rotation transmitting member is fixed to an end of the shaft 8 closer to the front bracket 1 by means of a bolt such that the pulley 9 integrally rotate. Rotation is transmitted to the pulley 9 through a belt as an endless transmitting belt from a crank pulley to which rotation of an engine (not shown) is transmitted. Therefore, the shaft 8 rotates in proportion to the engine revolution number and a pulley ratio of the pulley 9 and the crank pulley.

Two slip rings 10 are mounted on ends of the shaft 8 on the side of the rear bracket 2 such that the slip rings 10 integrally rotate together with the shaft 8, and electricity is supplied through two brushes 11 which slide in a state where the brushes 11 are pushed against the slip rings 10, respectively.

A front rotor member 12F and a rear rotor member 12R made of magnetic material are separately coupled to substantially central portions of the shaft 8 in a rotation axial direction through serration such that the front rotor members 12F and rear rotor member 12R integrally rotate with the shaft 8. To limit axial movement of the front rotor member 12F and the rear rotor member 12R in a state where they are opposed to each other in the axial direction and abut against each other, outer ends of the rotor members 12F and 12R plastically flow in an annular groove 8a formed in the shaft 8. A rotor 12 is constituted by the front rotor member 12F and the rear rotor member 12R fixed to the shaft 8 in this manner.

Plate-like fans 13F and 13R as ventilating means are mounted on both end surfaces of the rotor 12 in the rotation axial direction. The fans 13F and 13R are provided at their outer peripheries with a plurality of blades. The fans 13F and 13R integrally rotate with the rotor 12. The fans 13F and 13R flow air from the inner periphery side to the outer periphery side by a centrifugal force caused when the fans 13F and 13R rotate. The blade of the front fan 13F on the side of the front bracket 1 is smaller than the blade of the rear fan 13R on the side of the rear bracket 2, and a flow rate of flowing air of the front fan 13F is smaller than that of the rear fan 13R.

The front rotor member 12F and the rear rotor member 12R include shaft portions 12a located on the inner peripheral side, and a plurality of rotor pawl magnetic poles 12b which is located on the outer peripheral side and which has L-shaped cross section in the radial direction. A Randall type core is constituted by abutting ends of the shaft portions 12a of the rotor members 12F and 12R against each other. A field winding 14 is wound around a rotation shaft between the outer periphery of the shaft portion 12a and the inner periphery of the rotor pawl magnetic poles 12b. Both ends of the field winding 14 extend along the shaft 8 and are connected to the slip rings 10, respectively. Therefore, DC supplied from the brushes 11 through the slip rings 10 flows through the field winding 14. With this, the rotor 12 is magnetized and magnetic path is formed in the rotor 12 so as to go around the field winding 14. Current supplied to the field winding 14 is controlled in accordance with a state of a battery such that electricity generation is started when electricity generation voltage becomes higher than the battery voltage of the vehicle. However, an IC regulator (not shown) as a voltage control circuit for adjusting the electricity generation voltage is incorporated in a later-described rectifier circuit 15 disposed in the rear cover 5, and control is performed such that the terminal voltage of the terminal 6 is always constant.

A three-phase stator 17 is sandwiched and fixed between steps 16F and 16R provided between the thickness A and the thickness B in the front bracket 1 and between the thickness D and the thickness E in the rear bracket 2. The stator 17 includes a U-phase, a V-phase and a W-phase disposed from the side of the front bracket 1. All portions of the stator 17U of the U-phase and the stator 17V of the V-phase are accommodated in the inner periphery of the front bracket 1, and a portion of the stator 17W of the W-phase is accommodated in the inner periphery of the front bracket 1. Other portion is accommodated in the inner periphery of the rear bracket 2. Therefore, a contact area of the stator 17 with the front bracket 1 is greater than that with the rear bracket 2. Non-magnetic connection plates 18 are provided between the phases of the stator 17, and the phases are insulated from each other by the connection plates 18. The stator 17 is opposed to the outer peripheries of the rotor pawl magnetic poles 12b of the rotor 12 through slight gaps.

One of phases of the stator 17 includes a stator core 17a made of magnetic material, and a stator winding 17b annularly wound along the stator core 17a in the circumferential direction therein. The stator windings 17b of the phases are connected to the rectifier circuit 15 mounted in the rear cover 5. The rectifier circuit 15 is connected to the battery through the terminal 6.

The rectifier circuit 15 includes a plurality of diodes. Since the diodes constitute independent three-phase coils, full-wave rectification is carried out with six diodes.

Next, details of the rotor 12 will be explained based on FIGS. 3 and 4. As shown in FIG. 3, each of the front rotor member 12F and the rear rotor member 12R constituting the rotor 12 is provided with a plurality of, i.e., eight rotor pawl magnetic poles 12b from the outer end of the shaft portion 12a in the axial direction. The rotor pawl magnetic poles 12b have L-shaped cross section in the radial direction. The rotor pawl magnetic poles 12b extending from the front rotor member 12F and the rear rotor member 12R alternately disposed in the circumferential direction. Therefore, all of the rotor pawl magnetic poles 12b are totalized, and there are 16 rotor pawl magnetic poles 12b. That is, the number of magnetic poles of the rotor 12 is 16.

As shown in FIG. 4, in the rotor pawl magnetic poles 12b, a circumferential width B' of an intermediate portion 12b-2 opposed to the field winding 14 is smaller than a circumferential width A' of a root portion 12b-1, and a circumferential width C' of a tip end 12b-3 is smaller than the circumferential width B' of the intermediate portion 12b-2 opposed to the field winding 14. That is, a relation A'>B'>C' is established.

The root portion 12b-1 is provided with a first tapered portion 12b-4. The first tapered portion 12b-4 is tapered toward the field winding 14 at a substantially intermediate position which is a predetermined position in the axial direction in a range corresponding to the shaft portion 12a. The first tapered portion 12b-4 is provided from a substantially intermediate position which is a predetermined position in a radial direction range of the rotor pawl magnetic poles 12b. An inclined portion 12b-6 which is inclined such that the diameter thereof is reduced from the outer periphery side to the inner periphery side is provided on the root portion 12b-1 on the side of an end of the rotor 12 in the axial direction. The intermediate portion 12b-2 extends from the tapered portion of the first tapered portion 12b-4 in the axial direction. As shown in FIG. 3, the inner peripheral side of the rotor pawl magnetic poles 12b is inclined such that the width thereof in the radial direction is reduced toward its tip end.

The tip end 12b-3 is also provided with a second tapered portion 12b-5 which is tapered toward its tip end. The intermediate portion 12b-2 which has substantially the same width extends between the first tapered portion 12b-4 and the second tapered portion 12b-5 in the axial direction. The intermediate portion 12b-2 is provided in a range substantially opposed to the field winding 14. The taper angles of the first tapered portion 12b-4 and the second tapered portion 12b-5 are substantially the same. Therefore, gaps between the adjacent rotor pawl magnetic poles 12b are substantially equal to each other. Lateral lines of the rotor pawl magnetic poles 12b in a direction opposite from the rotation direction may largely be chamfered (not shown).

The field winding 14 is disposed between the front rotor member 12F and the rear rotor member 12R. The rotor members 12F and 12R are fixed to the shaft 8 in a state where the shaft portions 12a abut against each other so that the rotor pawl magnetic poles 12b are alternately located in the circumferential direction.

The front fan 13F and the rear fan 13R are mounted to axially outer ends of the front rotor member 12F and the rear rotor member 12R by means of welding or the like. The front fan 13F and the rear fan 13R are symmetrically disposed so that air flows in the center direction by rotation of the rotor 12. Explanation will be given based on the front fan 13F as an example. One side of a projection of a metal plate in the circumferential direction formed with a plurality of projections in the circumferential direction is folded and bent into substantially arc shape substantially vertically, and a blade having an inclined surface which is inclined with respect to the radial direction is integrally formed. The front fan 13F and the rear fan 13R formed in this manner are integrally fixed to axially outer ends of the front rotor member 12F and the rear rotor member 12R by means of welding. The ventilation means is constituted by the front fan 13F, the rear fan 13R and the rotor 12.

Next, details of the stator 17 will be explained based on FIGS. 3, 5, 6 and 7. As described above, the stator 17 includes three phases, i.e., the U-phase, the V-phase and the W-phase. As shown in FIG. 6, the annular, more specifically, disk-like connection plates 18 made of resin materials which are non-magnetic materials are interposed between the phases, and they are integrally formed. Four convex portions 181 are provided in each of both surfaces of the connection plate 18 at equal distances from one another in the circumferential direction. The convex portions 181 on one of the surfaces and the convex portions 181 on the other surface are deviated from each other by 45°. Concave portions 171 into which the convex portions 181 can be fitted are formed on both surfaces of the stator core 17a. If they are combined together, the phases are positioned in a state where they are deviated from each other by 120° at the electrical angle in accordance with the pitch of the rotor 12 as shown in FIGS. 5A and 5B.

One of the stators will be explained based on FIGS. 7A and 7B while taking the stator 17U of the U-phase as an example. The stator 17U includes the stator core 17a and the stator winding 17b. As shown in FIG. 7B, the stator core 17a is divided into two in the axial direction. Each of the divided stator core constituent members 17a' and 17a" includes an annular outer periphery 17a-1 provided on the side of the outer periphery having an L-shaped cross section in the radial direction, and a plurality of, i.e., eight stator pawl magnetic poles 17a-2 provided on the side of the inner periphery of the outer periphery 17a-1 and having an L-shaped cross section in the radial direction. Thus, the stator core constituent members 17a' and 17a" have a U-shaped cross section in the radial direction as a whole. The side surface of the stator pawl magnetic pole 17a-2 in the circumferential direction is inclined with respect to the rotation axis and thus, since the skew is provided, the stator pawl magnetic pole 17a-2 is formed into a substantially tapered trapezoidal shape.

Four pairs of convex portions 172 and concave portions 173 are provided between opposed surfaces of the stator core constituent members 17a' and 17a" in adjacent manner. The convex portions 172 are provided on substantially the intermediate portion of the stator pawl magnetic pole 17a-2 in the circumferential direction, and the concave portions 173 are provided substantially in the intermediate portion between the adjacent stator pawl magnetic poles 17a-2. Therefore, if they are fitted to each other and positioned, the stator pawl magnetic poles 17a-2 are alternately disposed in the circumferential direction, and the stator core 17a having 16 stator pawl magnetic poles 17a-2 which are deviated from each other by the electrical angle of 180° is constituted. That is, the number of magnetic poles of one phase of the stator 17 in this embodiment is 16, and this number is the same as the number of magnetic poles of the rotor 12.

The stator core constituent members 17a' and 17a" and the stator cores 17a of each phase are connected and fixed by resin charged into the gap between the stator pawl magnetic poles 17a-2. This resin portion appears on substantially the same surface as the inner surface of the stator pawl magnetic pole 17a-2. Since it is necessary to couple the stator cores 17a of the phases by means of the resin charged between the stator pawl magnetic poles 17a-2, the position of the connection plate 18 on the side of the inner periphery is set such that the connection plate 18 abuts against the outer periphery 17a-1 in the range of a side surface thereof and does not abut against the side surface of the stator pawl magnetic pole 17a-2. Therefore, resin is continuously charged into a gap between the stator pawl magnetic poles 17a-2 of a certain phase and a gap between stator pawl magnetic poles 17a-2 in another phase.

The stator core constituent members 17a' and 17a" are formed by charging iron powder which is subjected to insulation processing and by compressing the same, and the resultant material is subjected to magnetic anneal. Such a stator 17 is made into a so-called dust core. With this, eddy current is less prone to be generated and eddy current loss can be reduced. The stator core constituent members 17a' and 17a" are formed into substantially the same shape, and it is unnecessary to prepare different molds.

In the stator core 17a, the stator winding 17b is annularly wound in the circumferential direction along the outer periphery 17a-1. Insulating varnish is applied to a surface of the stator winding 17b, and a terminal end of the stator winding 17b is connected to a terminal 15a of the rectifier circuit 15 through between the stator pawl magnetic poles 17a-2 in the stator core 17a. An insulation paper which is an insulation member may be disposed between the stator core 17a and the stator winding 17b.

In the embodiment, the stator 17 is constituted such that all phases are the same, and the non-magnetic connection plates 18 are disposed between the phases deviated by the electrical angle of 120°. Resin is charged between the stator pawl magnetic poles 17a-2 so that the phases are not moved.

Next, the operation of the embodiment will be explained.

First, the engine is started, rotation is transmitted to the pulley 9 from a crankshaft through a belt and thus, the rotor 12 is rotated through the shaft 8. If DC is supplied to the field winding 14 provided in the rotor 12 from the brushes 11 through the slip rings 10, a magnetic flux which goes around inner and outer peripheries of the field winding 14 is generated. Thus, north pole or south pole is alternately formed in the rotor pawl magnetic poles 12b in the rotor 12 in the circumferential direction. The magnetic flux by the field winding 14 passes through the stator pawl magnetic pole 17a-2 extending from one side of the stator 17 in the axial direction from the rotor pawl magnetic poles 12b of the north pole of the front rotor member 12F and goes around the stator winding 17b, to reach the stator pawl magnetic pole 17a-2 extending from the other side in the axial direction. Further, the magnetic flux reaches the rotor pawl magnetic poles 12b of the south pole of the rear rotor member 12R, and a magnetic circuit going around the rotor 12 and the stator 17 is formed. The magnetic flux generated in the rotor interlinks with the stator winding 17b. Thus, AC induced voltage is generated in each of the U-phase, the V-phase and the W-phase, and AC induced voltage of three phases is generated as a whole.

AC voltage generated in this manner is full-wave rectified and converted into DC voltage by the rectifier circuit 15. The rectified DC voltage is achieved by controlling current supplied to the field winding 14 using the IC regulator (not shown) so that the DC voltage becomes constant voltage of about 14.3 V.

When the rotor 12 rotates, the front fan 13F and the rear fan 13R also rotate together with the rotor 12. Therefore, outside air is taken from the axial direction which is the inner periphery side as shown with the broken lines in FIG. 1, and air flow which is discharged out in the outer periphery direction is formed.

If the front fan 12F rotates, outside air is sucked in the axial direction from the ventilation holes 3 on the side of the inner periphery provided in the outer periphery of the ball bearing 7a in the front bracket 1. The sucked air flows toward the outer periphery by a centrifugal force generated by the blade of the front fan 12F, and the air is discharged from the ventilation holes 3 in the outer periphery provided in the thick portion on the side of the outer periphery of the front bracket 1. Since the one surface and the outer peripheral surface of the stator 17 in the axial direction are fixed in a state where they are in contact with the front bracket 1, heat generated in the stator 17 is sufficiently transmitted to the front bracket 1. Since the location to which the heat of the front bracket 1 is transmitted faces a location where air flows toward the ventilation holes 3 in the outer periphery, the stator 17 can be cooled.

If the rear fan 12R rotates, outside air is sucked in the axial direction from the ventilation holes 3 in the inner periphery provided in the outer periphery of the ball bearing 7b in the rear bracket 2 through the rectifier circuit 15 from the ventilation holes 3 formed in the outer peripheral line of the rear cover 5 and the ventilation hole formed in the inner periphery opening at the end surface of the rear cover 5 in the axial direction. The sucked air flows toward the outer periphery by a centrifugal force generated by the blade of the rear fan 12R and is discharged from the ventilation holes 3 formed on the side of the outer periphery provided in the outer periphery of the rear bracket 2. Therefore, like the front bracket 1, heat generated from the stator 17 and heat of the stator 17 transmitted to the rear bracket 2 are cooled by air flowing toward the ventilation holes 3 on the side of the outer periphery.

Air flows through the gap between the magnetic poles of the rotor 12 and the gap between the rotor 12 and the stator 17 due to a pressure difference between the pressure of the front fan 13F and the pressure of the rear fan 13R generated by rotation. In this embodiment, since the pressure generated at the rear fan 13R is increased, air flows toward the rear bracket from the front bracket 1 through the gap between the rotor 12 and the stator 17 and the gap between the rotor 12 and the magnetic pole, and the rotor 12 and the stator 17 are cooled.

The structure of the first embodiment has been explained. Effect of the first embodiment will be described below.

According to the first embodiment, the rotating electrical machine in which a rotor relatively rotates with respect to a stator is characterized in that the rotor includes a field winding wound around a rotation shaft, and a rotor core which surrounds the field winding and which includes a rotor pawl magnetic pole at a portion of the rotor opposed to a pawl magnetic pole of the stator core, and the stator includes a stator winding which is annularly wound around an outer periphery of the rotor, and a stator core which includes stator pawl magnetic poles alternately extending from axially both sides of a portion of the stator opposed to the rotor, and which surrounds a periphery of the stator winding. Since it is only necessary to annularly wind the stator winding around the outer periphery of the rotor, the operability is largely enhanced, the ratio of occupied area is also enhanced, a coil end is eliminated, and the winding resistance can be reduced.

Since the rotor includes the field winding, it is possible to change the field magnetic flux in accordance with a use or purpose.

According to the embodiment, since the skew is provided in the axial direction line of the stator pawl magnetic pole, it is possible to interlink the magnetic flux generated in the rotor smoothly, and magnetic noise can be reduced.

According to the embodiment, the circumferential width of a location of the rotor pawl magnetic pole which is opposed to at least the field winding becomes constant. Therefore, it is easy to interlink the magnetic flux generated by the field winding as compared with a rotor pawl magnetic pole which is tapered in the circumferential direction and thus, voltage to be induced can be increased.

According to the embodiment, the root portion of the rotor pawl magnetic pole is formed wider than the intermediate portion, and the intermediate portion is formed wider than the tip end. The intermediate portion has substantially constant width. When the width of the intermediate portion is made substantially constant so that area of each of phases arranged axially opposed to the stator is not largely varied, magnetic saturation is easily generated in the root portion. However, since the root portion is wide, the magnetic saturation is moderated and the magnetic flux amount can be increased. When only the root portion is made wide, since a distance between the adjacent rotor pawl magnetic poles becomes narrow, magnetic flux easily leaks. However, since the tip end becomes narrower than the intermediate portion correspondingly to the root portion, a gap between the adjacent rotor pawl magnetic poles can sufficiently be secured.

According to the embodiment, a rotating electrical machine in which a rotor relatively rotates with respect to a stator, includes a Randall type rotor having a field winding and 16 magnetic poles, and a stator including a stator core provided at a location opposed to an outer periphery of the rotor and a stator winding wound in the stator core, the stator winding being annularly wound around the outer periphery of the rotor, and the stator core including 16 stator pawl magnetic poles alternately extending from both sides in the axial direction at locations opposed to the rotor. As the number of magnetic poles is higher, the induced voltage can be increased. However, if the number of magnetic poles of the rotor is excessively high, a distance between the magnetic poles becomes too short. Further, leakage of magnetic flux is increased, inductance or iron loss is increased and the output and efficiency are deteriorated. The present applicant found that the number of poles of the rotor suitable for enhancing output and efficiency as the rotating electrical machine was in a range of 12 to 24. It was found that if the number of magnetic poles of the stator was in a range of 12 to 24 while keeping in balance with the number of magnetic poles of the rotor, the induced voltage to be output could be enhanced. When a Randall type rotor is employed, there is a problem that the rotor pawl magnetic pole is deformed by a centrifugal force. However, it was found that if the number of poles of the rotor was 24 or less, such deformation of the rotor pawl magnetic pole did not cause any problem. It was found that to further enhance the output, the number of poles of the rotor should be in a range of 16 to 24, and the output could be enhanced most if the number of poles was 16. The number of magnetic poles of the stator had the same tendency as the number of magnetic poles of the rotor, and it was found that the preferable number of poles was in a range of 16 to 24. Similar to the number of magnetic poles of the rotor, the output could be enhanced most when the number of magnetic poles of the stator was 16. Based on such results, the number of the magnetic poles of the rotor and the number of magnetic poles of the stator are set to 16 in this embodiment.

According to the embodiment, the thickness of the front bracket on the side of the outer periphery in the radial direction is thin on the side of the rear bracket, and the thickness on the side of the bottom is thick. The outer periphery of the end on the side of the rear bracket is fitted at the fitting portion to the rear bracket. Thus, the stators are disposed such that at least outer periphery comes into contact with the step provided with the thick portion of the outer peripheral portions of the front bracket and the rear bracket in the radial direction, and the ventilation hole through which air flows is provided in the thick portion to secure a surface area. Thus, heat generated in the stator can be transmitted to the bracket and the stator can be cooled sufficiently. Since air from the ventilation means flows through the ventilation hole, the cooling effect can be enhanced. Since the front bracket and the rear bracket are fitted to each other while forming a fitting portion by the step provided on the outer periphery and the step provided on the inner periphery, heat of the front bracket and the rear bracket can sufficiently be exchanged. Since the stator is in more contact with the front bracket having the thick portion, the stator is easily cooled. A cooling fin may be provided in the ventilation hole to enhance the cooling effect.

According to the embodiment, when the stator winding of each phase is connected to the rectifier circuit, since the stator winding passes through the gap between the stator pawl magnetic poles, it is unnecessary to make a hole in the stator core. Therefore, the price is inexpensive and no influence is exerted on the magnetic circuit. Since resin as non-magnetic material is charged into the gap between the stator pawl magnetic poles, the stator winding can be held. The stators of the phases and the stator core constituent member can be fixed. It is also possible to enhance the strength of the stator including the stator pawl magnetic pole by the resin. In addition, in the embodiment, since the resin and the stator pawl magnetic pole are substantially flush with each other, wind nose caused by rotation of the rotor can be reduced. If the surface of the stator pawl magnetic pole is not coated with resin, the gap with respect to the rotor can be reduced and thus, magnetic flux can easily pass therethrough.

Second Embodiment

Figure 8A:
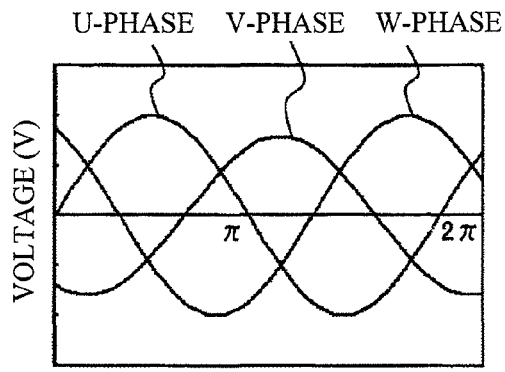
FIGS. 8A and 8B are diagrams of output waveform of voltage induced in each phase in a first embodiment and of output waveform of voltage induced in each phase.
Figure 8B:
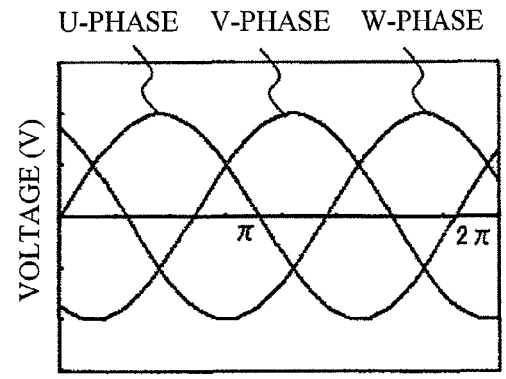
Figure 9:
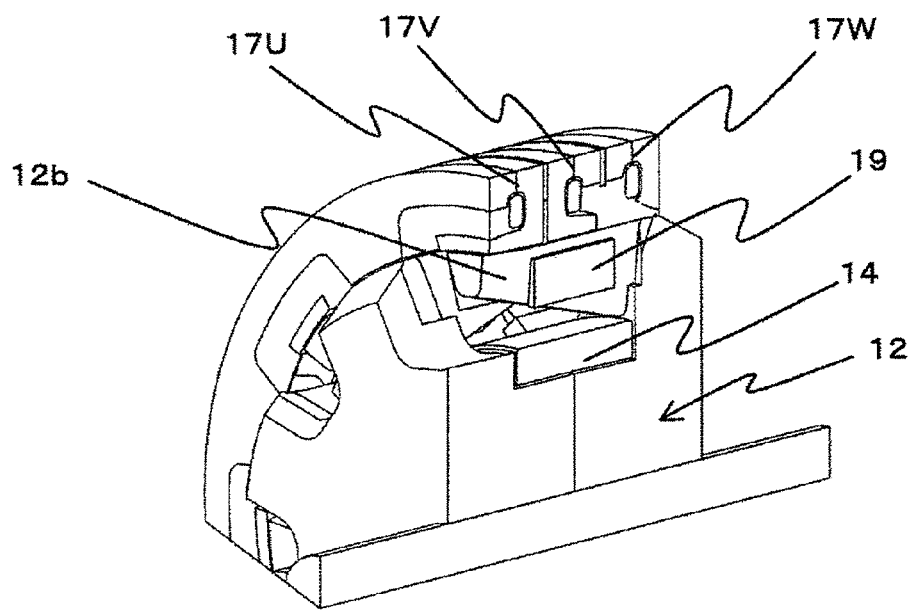
FIG. 9 is a sectional perspective view of side surfaces of a rotor and a stator of a second embodiment.

Next, a second embodiment will be explained based on FIGS. 8A and 8B and FIG. 9. FIG. 8A shows output waveform of voltage induced in each phase in the first embodiment. FIG. 8B shows output waveform of voltage induced in each phase in the second embodiment. FIG. 9 is a perspective view showing a rotor and a stator in the second embodiment in section. The same elements as those of the first embodiment are designated with the same name and the same symbols.

As explained above, in the stator 17 of the first embodiment, the stator cores 17a of the U-phase, the V-phase and the W-phase are disposed adjacent to each other through the connection plates 18. However, even if the phases are connected to each other through the non-magnetic connection plates 18, magnetic flux may leak into the adjacent stator core 17a in some cases. When magnetic flux leaks into the adjacent stator core 17a, magnetic flux leaks into both sides of the stator core 17a of the V-phase disposed between the U-phase and the W-phase. Therefore, the induced voltage to be output becomes smaller as compared with the U-phase and the W-phase as shown in FIG. 8A. Thus, DC voltage after it is rectified by the rectifier circuit can not be increased.

Hence, in the second embodiment, as shown in FIG. 9, a permanent magnet 19 is provided at the portion of the V-phase stator 17V between the rotor pawl magnetic poles 12b. The permanent magnet 19 has a substantially square cross section in the axial direction. The polarity of the permanent magnet 19 is polarized such that when the field winding 14 is excited the polarity of the permanent magnet 19 is opposite from that of the magnetic pole formed in the rotor pawl magnetic poles 12b. Therefore, the leakage magnetic flux of the V-phase stator 17V between the rotor pawl magnetic poles 12b is reduced as compared with other phase. Thus, the induced voltage is increased, and this can be balanced with voltage induced in the other phase as shown in FIG. 8B. The balance means is constituted by such a permanent magnet 19, and a ferrite magnet is used as the magnet. The axial length of the permanent magnet 19 is the same as the axial length of the V-phase stator 17V and may be opposed to the V-phase stator 17V. However, it is not necessary that the axial length of the permanent magnet 19 is quite the same as the axial length of the V-phase stator 17V, and it is only necessary that the balance of the V-phase stator 17V can be kept with respect to the U-phase stator 17U and the W-phase stator 17W.

Since the second embodiment has the balance means for balancing the voltage induced in a phase other than phases disposed at both ends in the axial direction with the induced voltage, induced voltage in all phase can be balanced, and the induced voltage to be output can be increased.

The balance means in the second embodiment is means for increasing voltage induced in a phase other than phases disposed at both ends in the axial direction. Therefore, the induced voltage can be increased as a whole as compared with a case in which the induced voltage of U-phase and W-phase is reduced and balanced with the V-phase.

Since the balance means of the second embodiment is constituted by the permanent magnet at least provided opposed to the phase other than phases disposed at both ends in the axial direction, the balance function can be provided without increasing the shapes of the rotor and the stator.

Since the permanent magnet of the second embodiment is provided only on a portion opposed to the phase other than phases disposed at both ends in the axial direction, the balance means can be constituted by a permanent magnet having a simple shape. Therefore, the balance means can be constituted inexpensively.

Third Embodiment

Figure 10:
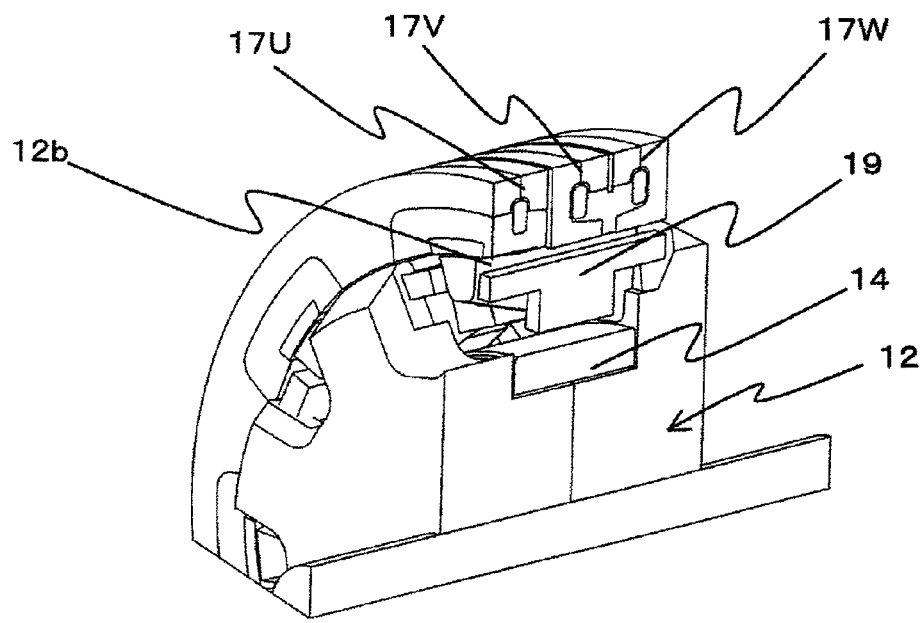
FIG. 10 is a sectional perspective view of a rotor and a stator of a third embodiment.

Next, a third embodiment will be explained based on FIG. 10. FIG. 10 is a perspective view showing a rotor and a stator of the third embodiment in section. The same elements as those of the other embodiments are designated with the same name and the same symbols.

In the third embodiment, the shape of the permanent magnet 19 is different from that of the second embodiment, but other portions are substantially the same as those in the second embodiment. In the permanent magnet 19 of the third embodiment, a portion corresponding to the V-phase stator 17V is thick so that a cross section in the axial direction assumes substantially T-shape, and portions corresponding to the U-phase stator 17U and the W-phase stator 17W are thin.

Therefore, in the V-phase stator 17V, the leakage magnetic flux between the rotor pawl magnetic poles 12b is reduced as compared with other phases, and the leakage magnetic flux is increased as compared with the V-phase stator 17V. However, the leakage magnetic flux can be reduced in the U-phase stator 17U and the W-phase stator 17W. Thus, the induced voltage of all phases can be increased and the induced voltage of the phases can be balanced.

According to the permanent magnet of the third embodiment, the magnetic force at the portion opposed to a phase other than phases disposed on the both ends in the axial direction is stronger than magnetic force at a portion opposed to the phases disposed on the both ends in the axial direction. Therefore, the induced voltage of the phases can be increased while keeping balance. More specifically, both ends of the permanent magnet in the axial direction are made thin. Therefore, it is possible to keep the induced voltage in balance and to increase the induced voltage only by disposing one permanent magnet between the rotor pawl magnetic poles.

Fourth Embodiment

Figure 11:
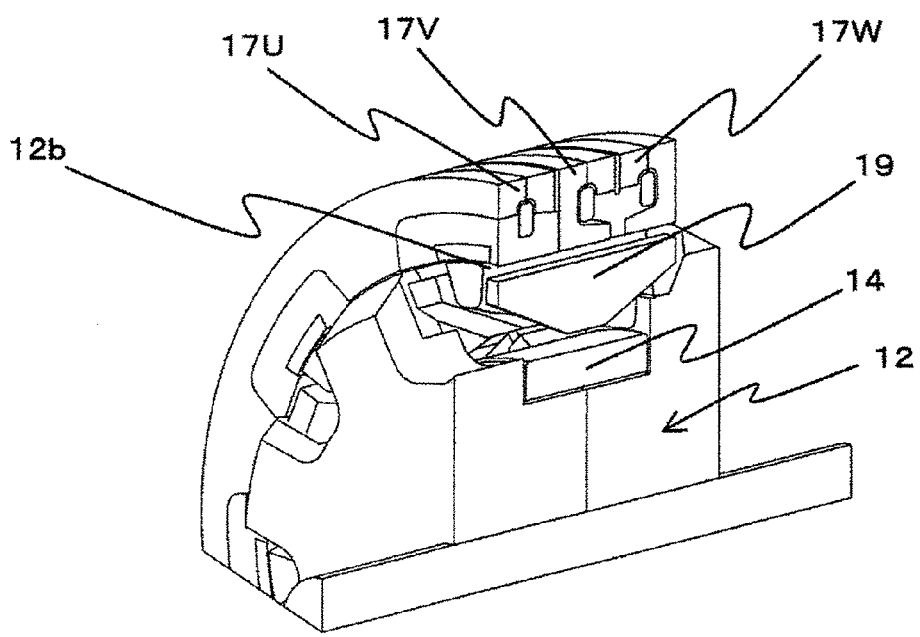
FIG. 11 is a sectional perspective view of a rotor and a stator of a fourth embodiment.

Next, a fourth embodiment will be explained based on FIG. 11. FIG. 11 is a perspective view showing a rotor and a stator of the fourth embodiment in section. The same elements as those of the other embodiments are designated with the same name and the same symbols.

In the fourth embodiment, the shape of the permanent magnet 19 is different from that of the third embodiment, but other portions are substantially the same as those in the third embodiment. The permanent magnet 19 of the fourth embodiment has a substantially trapezoidal shape whose cross section in the axial direction becomes wider toward the outer periphery, and a portion thereof corresponding to the V-phase stator 17V corresponds to a short side of the trapezoidal shape on the side of the inner periphery. The width thereof in the axial direction is continuously increased from the short side on the side of the inner periphery toward the outer periphery. Therefore, portions of the permanent magnet 19 corresponding to the U-phase stator 17U and the W-phase stator 17W are thinner than a portion thereof corresponding to the V-phase stator 17V.

Like the third embodiment, the leakage magnetic flux of the V-phase stator 17V between the rotor pawl magnetic poles 12b is reduced as compared with other phases. Leakage magnetic flux in each of the U-phase stator 17U and the W-phase stator 17W can be reduced. In the fourth embodiment, the thickness thereof is reduced continuously, and the thickness of the permanent magnet 19 is set in accordance with the amount of leakage magnetic flux. Thus, the leakage magnetic flux amount can be reduced as compared with the third embodiment while keeping the induced voltage in balance. Since there is no location in the permanent magnet 19 that is abruptly thinned, the strength of the permanent magnet 19 can be enhanced.

Fifth Embodiment

Figure 12:
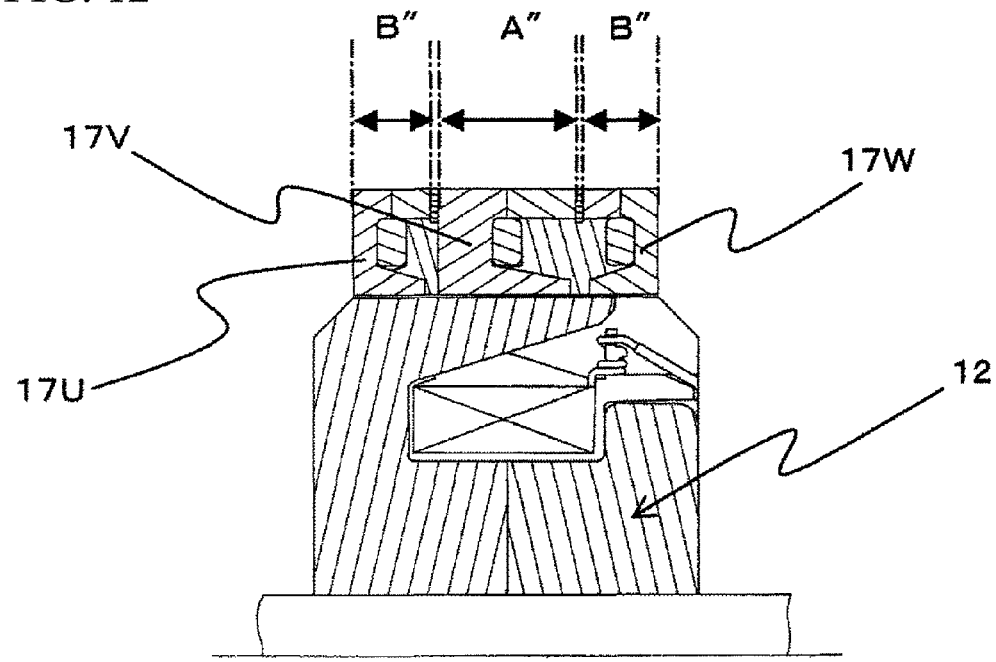
FIG. 12 is a side sectional view of a rotor and a stator of a fifth embodiment.

Next, a fifth embodiment will be explained based on FIG. 12. FIG. 12 is a side sectional view of a rotor and a stator of the fifth embodiment. The same elements as those of the other embodiments are designated with the same name and the same symbols.

The fifth embodiment is different from the second and third embodiments in which the permanent magnet 19 is provided between the rotor pawl magnetic poles to constitute the balance means. In the fifth embodiment, an axial length A" of the stator core 17a of the V-phase stator 17V is set longer than an axial length B" of the stator core 17a of each of the U-phase stator 17U and the W-phase stator 17W. Magnetic flux passing between the rotor 12 and the stator core 17a of the V-phase stator 17V flows easier than magnetic flux passing between the rotor 12 and the stator core 17a of each of the U-phase stator 17U and the W-phase stator 17W, thereby constituting the balance means. The axial size of the stator core 17a of the V-phase stator 17V is longer than those of the U-phase stator 17U and the W-phase stator 17W, and the length of the stator pawl magnetic pole 17a-2 is also longer than those of the U-phase stator 17U and the W-phase stator 17W.

In the embodiment, there is provided balance means by which magnetic flux passing between the rotor and phases disposed on the both ends in the axial direction does not pass easier than magnetic flux passing between the rotor and a phase other than those described above. Therefore, induced voltage in all phases can be balanced.

According to the balance means of the fifth embodiment, the stator cores disposed on the both ends in the axial direction is shorter than a stator core other than those. Therefore, induced voltage of phases can be balanced without adding a new member.

Sixth Embodiment

Figure 13:
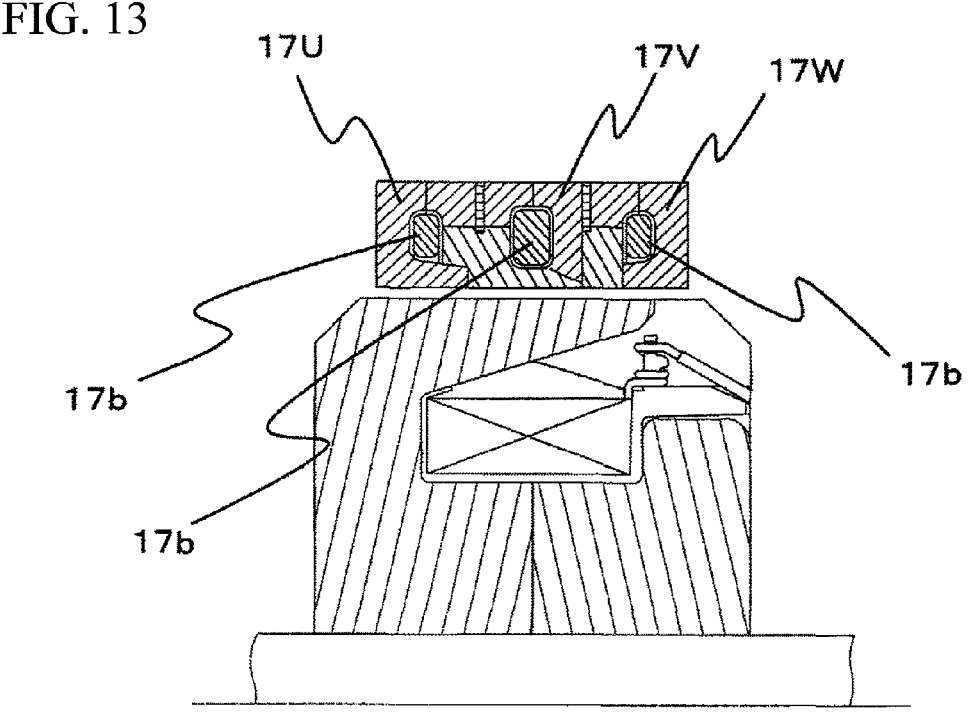
FIG. 13 is a side sectional view of a rotor and a stator of a sixth embodiment.

Next, a sixth embodiment will be explained based on FIG. 13. FIG. 13 is a side sectional view of a rotor and a stator of the sixth embodiment. The same elements as those of the other embodiments are designated with the same name and the same symbols.

In the sixth embodiment, the winding times of the stator winding 17b in the V-phase is greater than the winding times of the stator windings 17b in the U-phase and the W-phase, thereby constituting the balance means. Thus, the stator winding 17b can be wound around the stator core 17a of the V-phase more times as compared with the U-phase and the W-phase. Other portions are the same as those in the first embodiment and thus, explanation thereof will not be described.

According to the balance means of the sixth embodiment, the winding times of the stator winding of phases disposed on the both ends in the axial direction are smaller than the winding times of the stator winding in a phase other than the former phases. Therefore, induced voltage of the phases can be balanced while reducing the number of locations to be changed as small as possible. Only the stator winding may be changed without changing the stator core of each phase. In order to increase the induced voltage to be output as high as possible, an annular space around which the stator winding in the stator core of the V-phase is wound should be set greater than those of the U-phase and the W-phase, and the stator winding should be wound as many as possible in this annular space.

Seventh Embodiment

Figure 14A:
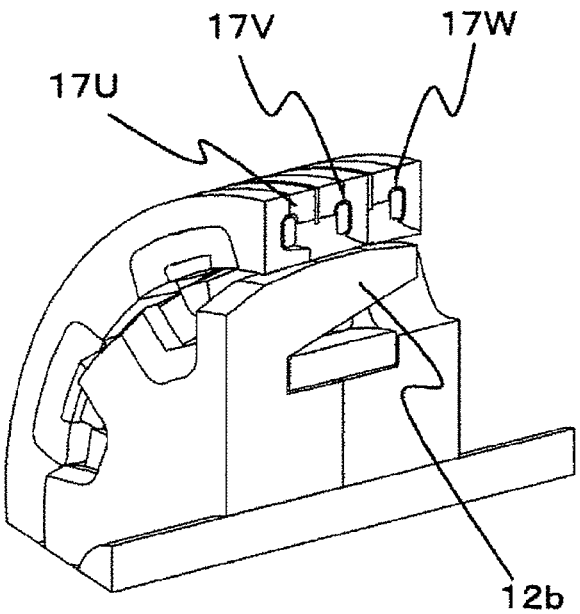
FIGS. 14A and 14B are a sectional perspective view of a rotor and a stator of a seventh embodiment and a side sectional view of the rotor and the stator.
Figure 14B:
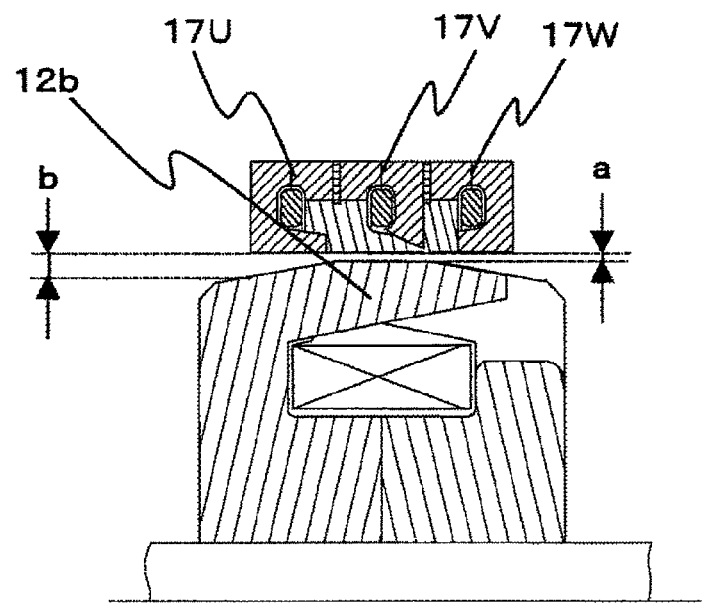

Next, a seventh embodiment will be explained based on FIGS. 14A and 14B. FIG. 14A is a perspective sectional view of a rotor and a stator in the seventh embodiment. FIG. 14B is a side sectional view of the rotor and the stator of the seventh embodiment. The same elements as those of the other embodiments are designated with the same name and the same symbols.

As shown in FIGS. 14A and 14B, in the seventh embodiment, gaps between the rotor pawl magnetic poles 12b and the stators 17 of the phases in the radial direction are set such that a gap a at a position opposed to the V-phase stator 17V is narrow and a gap b at a position opposed to the U-phase stator 17U and the W-phase stator 17W is wide, thereby constituting the balance means. To constitute this balance means, both ends of all of the rotor pawl magnetic poles 12b in the axial direction which are opposed to the U-phase stator 17U and the W-phase stator 17W are notched into a tapered shape. Other portions are substantially the same as those in the first embodiment and thus, explanation thereof will not be described. The shape of the outer peripheral surface of the rotor pawl magnetic pole 12b is substantially trapezoidal shape, but the shape may be a continuous convex shape or a stepped convex shape.

According to the balance means of the seventh embodiment, the gap between the rotor and the stator pawl magnetic pole of the stator core disposed on both ends in the axial direction is greater than the gap between the rotor and the stator pawl magnetic pole of a stator core other than the former stator core. A magnetic resistance by the gap between a phase and a rotor disposed on both ends in the axial direction is greater than a magnetic resistance by a gap between a phase and a rotor other than the former phase and a rotor. With this, magnetic flux can pass through easily, and induced voltage of all phases can be balanced. Since the balance means can be constituted only by machining a conventional rotor pawl magnetic pole, the number of parts is not increased and it is unnecessary to newly design again. If the outer peripheral surface of the rotor pawl magnetic pole is formed into a tapered shape or a continuous convex shape, since the rotor pawl magnetic pole is not formed with a step, even if a centrifugal force is applied, the strength can be maintained.

Eighth Embodiment

Figure 15A:
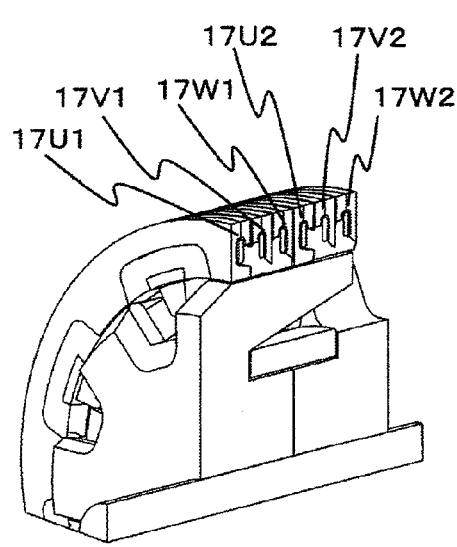
FIGS. 15A, 15B, 15C and 15D are a sectional perspective view of a rotor and a stator of an eighth embodiment, a side sectional view of the rotor and the stator and diagrams showing crosslines of the stator winding.
Figure 15B:
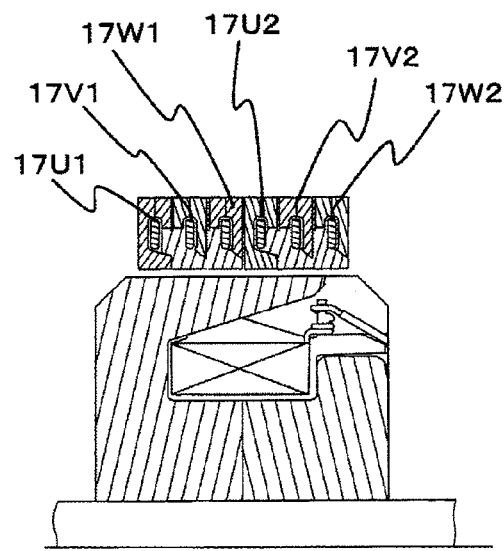
Figure 15C:
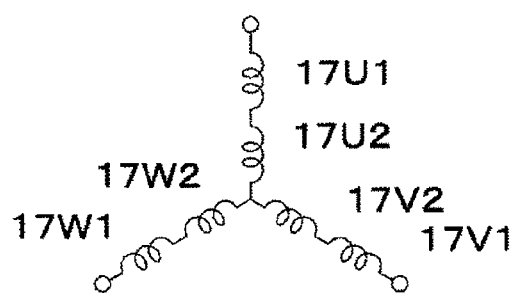
Figure 15D:
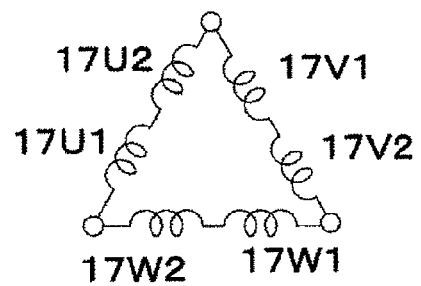

Next, an eighth embodiment will be explained based on FIGS. 15A, 15B, 15C and 15D. FIG. 15A is a perspective sectional view of a rotor and a stator in the eighth embodiment. FIG. 15B is a side sectional view of the rotor and the stator in the eighth embodiment. FIG. 15C is a diagram showing one example of crosslines of the stator winding in the eighth embodiment. FIG. 15D is a diagram showing another example of crosslines of the stator winding in the eighth embodiment. The same elements as those of the other embodiments are designated with the same name and the same symbols.

In the eighth embodiment, a pair of stators 17 are provided for each of the U-phase, the V-phase and the W-phase. That is, as shown in FIGS. 15A and B, six stators 17, i.e., a first U-phase stator 17U1, a first V-phase stator 17V1, a first W-phase stator 17W1, a second U-phase stator 17U2, a second V-phase stator 17V2 and a second W-phase stator 17W2 are arranged from one end in the axial direction in this order with connection plates 18 interposed therebetween. The stator windings 17b of the phases in the stators 17 are connected in series as shown in FIGS. 15C and D, and the phases may be connected in a form of a star crossline as shown in FIG. 15C, or in a form of a Δ crossline as shown in FIG. 15D. The balance means is constituted in this manner in the eighth embodiment.

As described above, induced voltage of stators disposed on both ends in the axial direction is smaller than induced voltage of a stator other than the former stators, and leakage in magnetic flux in a case where a plurality of stators are adjacent is greater than a case in which one stator is adjacent. Hence, the first U-phase stator 17U1 and the second W-phase stator 17W2 are located at ends in the axial direction, and the induced voltage is the greatest. The first V-phase stator 17V1 and the second V-phase stator 17V2 have only one stator 17 which is adjacent on the side of one end, and a plurality of stators 17 are disposed on the other end. The induced voltage is smaller than that of the first U-phase stator 17U1 and the second W-phase stator 17W2. Since a plurality of stators 17 are disposed on both ends of the first W-phase stator 17W1 and the second U-phase stator 17U2, the induced voltage is smaller than that of the first V-phase stator 17V1 and the second V-phase stator 17V2. The induced voltage of each phase has a relation of first U-phase=second W-phase>first V-phase=second V-phase>first W-phase=second U-phase, and the phases are connected to each other in series, the induced voltage of the phases can be balanced.

According to the balance means of the eighth embodiment, a plurality of sets of phases of stators are provided, and the same phases are disposed from one end in the axial direction in the same order. The stator windings in the same phase are connected to each other in series. Thus, balance can be kept in a state where voltage induced by the stator winding of each phase is totally increased instead of keeping balance by reducing voltage induced by the stator winding of a partial phase. In the eighth embodiment, the induced voltage can further be enhanced by providing permanent magnets which are different from those of the second to fourth embodiments and which have the same thickness over the entire region opposed to the stator between the rotor pawl magnetic pole, or by reducing the gap between the inner peripheral surface of the stator core and the outer peripheral surface of the rotor pawl magnetic pole as small as possible.

Ninth Embodiment

Figure 16A:
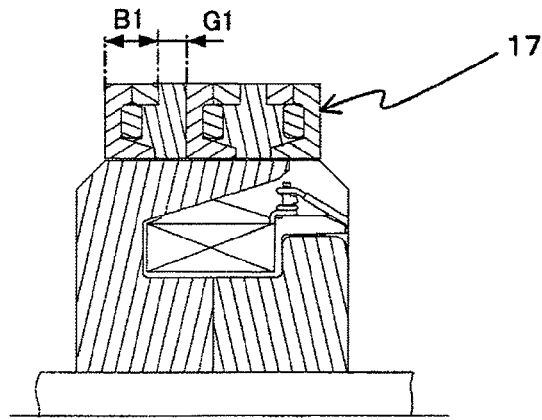
FIGS. 16A, 16B and 16C are a side sectional view of a rotor and a stator of a ninth embodiment, a graph showing a relation between an interphase gap ratio and induced voltage, and a graph showing a relation between the interphase gap ratio and voltage amplitude.
Figure 16B:
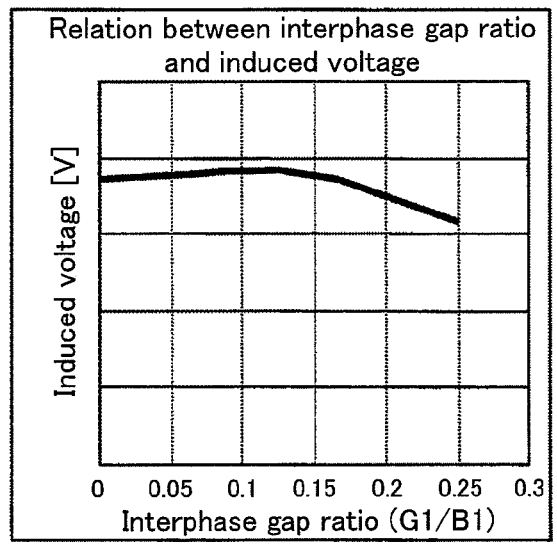
Figure 16C:
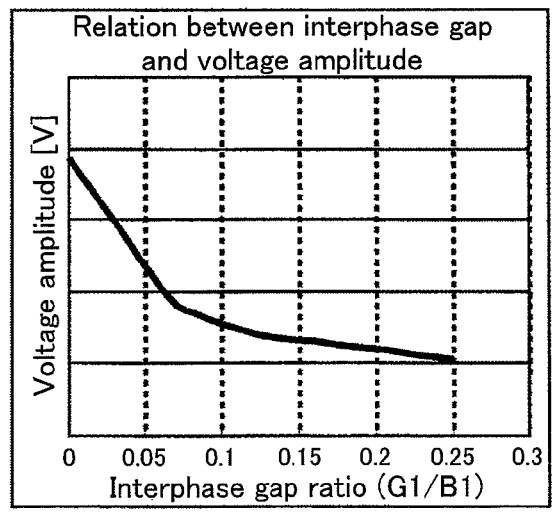

Next, a ninth embodiment will be explained based on FIGS. 16A, 16B and 16C. FIG. 16A is a side sectional view of a rotor and a stator in the ninth embodiment. FIG. 16B is a graph showing a relation between an interphase gap ratio and induced voltage. FIG. 16C is a graph showing a relation between the interphase gap ratio and voltage amplitude. The same elements as those of the other embodiments are designated with the same name and the same symbols.

In the ninth embodiment, as shown in FIG. 16A, the balance means is constituted by increasing a gap G1 of each interphase in the axial direction in the stator 17 greater than that of the first embodiment, and resin is charged instead of the connection plate 18. If the gap G1 of each interphase in the axial direction in the stator 17 is increased in this manner, the leakage magnetic flux of each interphase can be reduced. However, since the axial length of the rotor 12 is determined, if the gap G1 is excessively large, the axial length B1 of the stator 17 of each phase is reduced.

Hence, concerning the relation between induced voltage and interphase gap ratio (G1/B1) which is a ratio between the gap G1 and the axial length B1 of the stator 17, experiments as show in FIGS. 16B and 16C were carried out. FIG. 16B is a graph in which a lateral axis shows an interphase gap ratio (G1/B1) and a vertical axis shows a voltage value in which induced voltage of phases are averaged and totalized. According to FIG. 16B, necessary induced voltage can be satisfied when the interphase gap ratio (G1/B1) is 0.2 or less. In the waveform in FIG. 16B, the interphase gap ratio (G1/B1) has a peak at 0.13 to 0.15 and the induced voltage starts lowering. Satisfactory voltage can be induced when the interphase gap ratio (G1/B1) is 0.2 or less, preferably 0.15 or less and more preferably 0.13 or less.

However, if the interphase gap ratio (G1/B1) is made excessively small, since the induced voltage of V-phase is reduced as shown in FIG. 8A, a voltage value in which induced voltage values of the phases are totalized is lowered in some cases. FIG. 16C shows a graph in which a lateral axis shows an interphase gap ratio (G1/B1), and a vertical axis shows amplitude of a voltage value in which induced voltage values of the phases are totalized. According to FIG. 16C, if the interphase gap ratio (G1/B1) is 0.05 or less, the amplitude of the voltage value in which the induced voltage values of the phases are totalized becomes large. If the interphase gap ratio (G1/B1) is 0.05 or more, amplitude by which necessary induced voltage can be output is obtained. The amplitude starts stabilizing when the interphase gap ratio (G1/B1) exceeds 0.07, and the amplitude is stabilized when the interphase gap ratio (G1/B1) is about 0.1.

According to the ninth embodiment, if the interphase gap ratio (G1/B1) is set to 0.05 to 0.2, induced voltage having small amplitude can sufficiently be output. If the interphase gap ratio (G1/B1) is set to 0.07 to 0.15, the induced voltage can be increased. It is preferable that the interphase gap ratio (G1/B1) is set to 0.1 to 0.13.

Tenth Embodiment

Figure 17A:
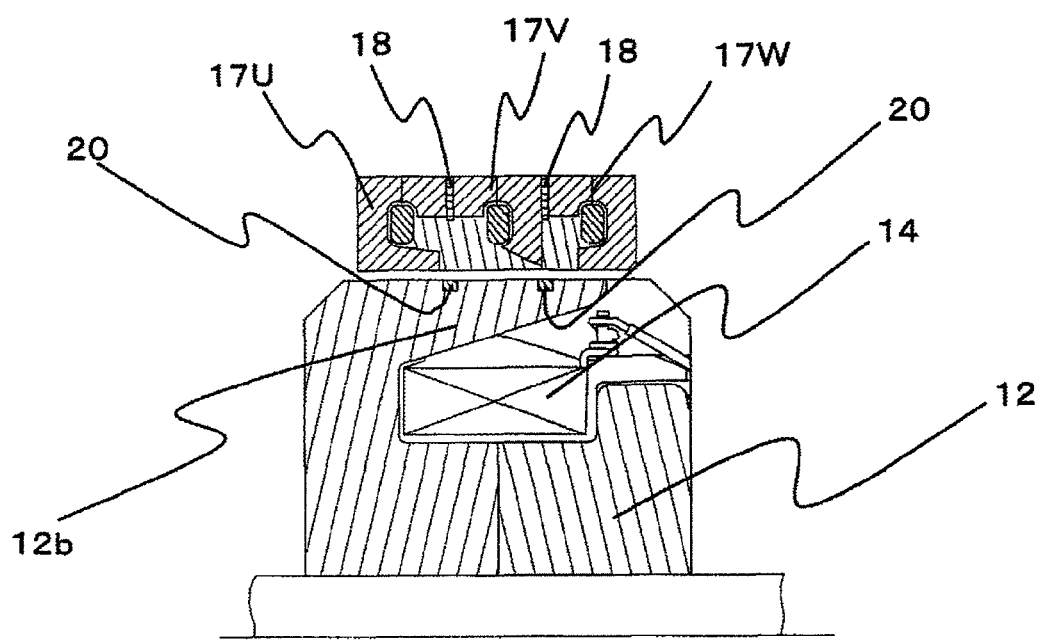
FIGS. 17A and 17B are a side sectional view of a rotor and a stator of a tenth embodiment and a diagram of the rotor as viewed from an outer periphery.
Figure 17B:
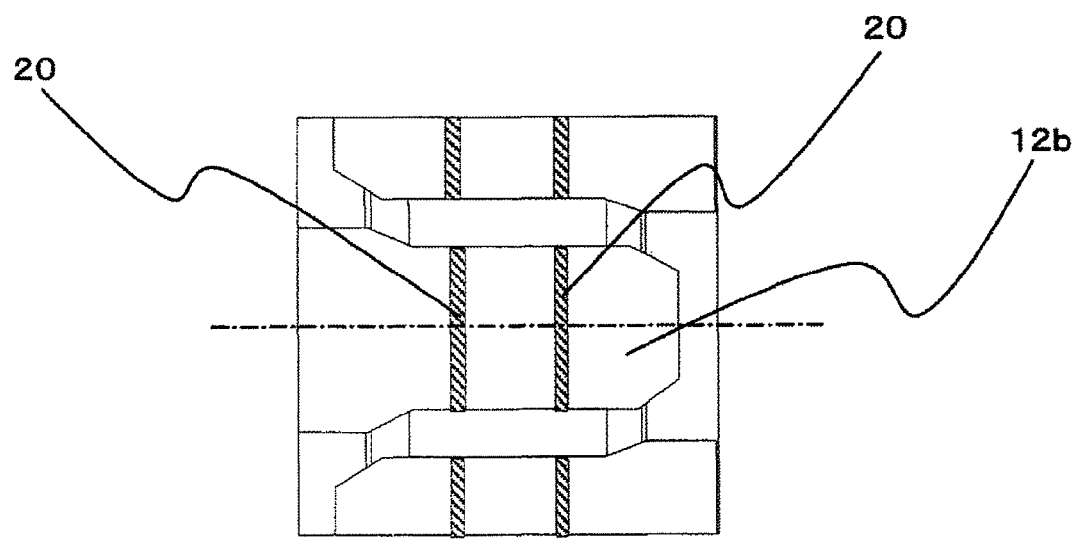

Next, a tenth embodiment will be explained based on FIGS. 17A and 17B. FIG. 17A is a side sectional view of a rotor and a stator in the tenth embodiment. FIG. 17B is a diagram of the rotor of the tenth embodiment as viewed from the outer periphery. The same elements as those of the other embodiments are designated with the same name and the same symbols.

In the tenth embodiment, insulation grooves 20 having a rectangular cross section extending in the circumferential direction is provided on outer peripheral surfaces of the rotor pawl magnetic poles 12b in the rotor 12, and non-magnetic material such as resin is charged into the insulation grooves 20. Each insulation groove 20 is provided in a portion opposed to the connection plate 18 between the U-phase stator 17U and the V-phase stator 17V, and a portion opposed to the connection plate 18 between the V-phase stator 17V and the W-phase stator 17W. The insulation groove 20 is slightly wider than a thickness of the connection plate 18. Since other portions are substantially the same as those in the first embodiment, explanation thereof will not be described.

Since the insulation grooves 20 are provided in the rotor pawl magnetic poles 12b in the rotor 12 opposed to portions between the stators 17 of the phases. Therefore, it is possible to reduce the magnetic flux which leaks to other stator through the surface of the rotor 12 from the stator 17, and the magnetic flux can flow around the field winding 14 from the stator 17 of each phase. Therefore, induced voltage values of the phases can be balanced. The insulation grooves 20 constitute the balance means. The insulation grooves 20 can reduce the eddy current generated on the surfaces of the rotor pawl magnetic poles 12b, and enhances the efficiency.

The non-magnetic materials are charged into the insulation grooves 20 in the tenth embodiment. If the strength of the rotor pawl magnetic pole 12b is sufficiently secured, it is not necessary to charge something into the insulation groove 20 because air functions as the non-magnetic material, and the leakage magnetic flux can be reduced. Since the non-magnetic material is not charged, the cost can be reduced.

Eleventh Embodiment

Figure 18A:
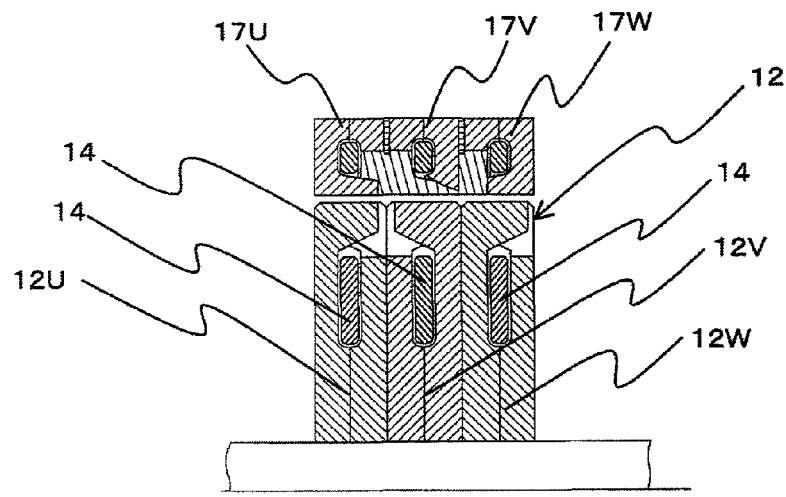
FIGS. 18A, 18B and 18C are a side sectional view of a rotor and a stator of an eleventh embodiment, a diagrams showing disposition of rotor pawl magnetic poles and stator pawl magnetic poles and a diagram showing other mode of the dispositions of the rotor pawl magnetic poles and the stator pawl magnetic poles.
Figure 18B:
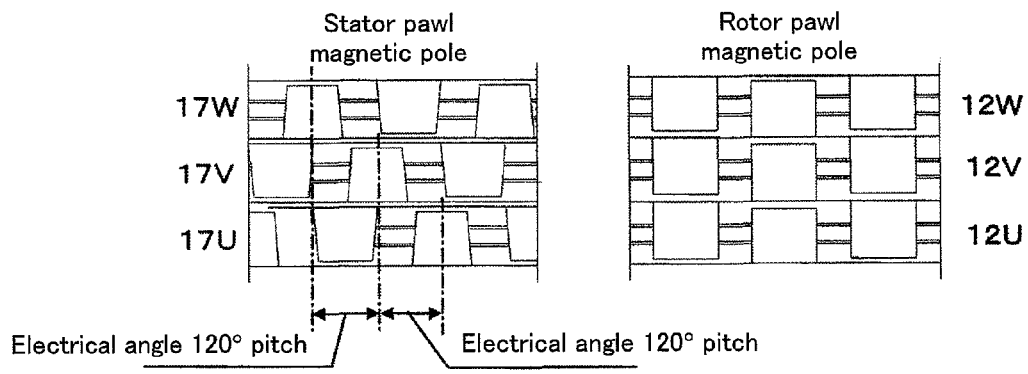
Figure 18C:
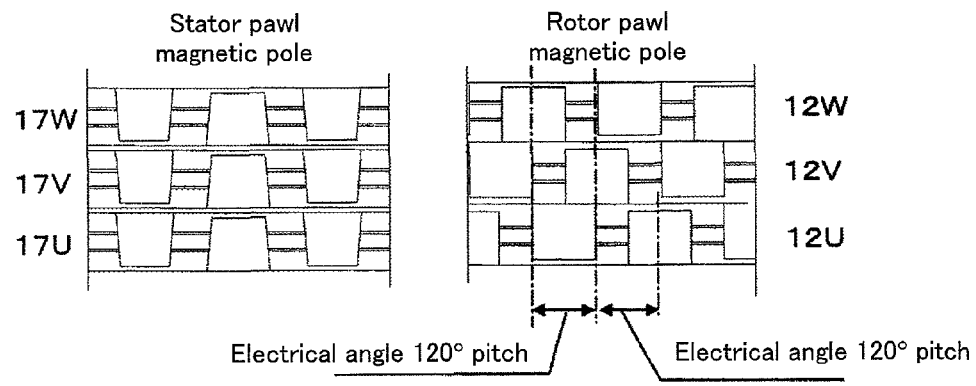

Next, an eleventh embodiment will be explained based on FIGS. 18A, 18B and 18C. FIG. 18A is a side sectional view of a rotor and a stator according to the eleventh embodiment. FIG. 18B is a diagram showing dispositions of a rotor pawl magnetic pole and a stator pawl magnetic pole of the eleventh embodiment. FIG. 18C is a diagram showing another example of the disposition of the rotor pawl magnetic pole and the stator pawl magnetic pole of the eleventh embodiment. The same elements as those of the other embodiments are designated with the same name and the same symbols.

In the eleventh embodiment, the rotor 12 is divided into three in correspondence with the U-phase stator 17U, the V-phase stator 17V and the W-phase stator 17W. One of them has a ⅓ length of the rotor 12 in the axial direction of the first embodiment. The axial length of the rotor pawl magnetic pole 12b is also about ⅓ of the first embodiment, and the number of winding times of the field winding 14 is also smaller. In a state where the three divided rotors 12U, 12V and 12W are adjacent to one another, the rotor 12 is constituted.

As show in FIG. 18B, the stator pawl magnetic pole 17a-2 is disposed in a state where the U-phase stator 17U, the V-phase stator 17V and the W-phase stator 17W are deviated in the circumferential direction by the electrical angle of 120° like the first embodiment, but the rotor pawl magnetic poles 12b are disposed at the same phase in which the divided rotors 12U, 12V and 12W are not deviated by the electrical angle.

Since the rotor 12 is divided into the phases of the stator 17, the magnetic fluxes flows around in a state where they are independent from each other, and the induced voltage values can be balanced. The divided rotors 12U, 12V and 12W constitute the balance means.

In FIG. 18B, the stator pawl magnetic poles 17a-2 of the phases are disposed so as to be deviated from each other by the electrical angle of 120°, and the rotor pawl magnetic poles 12b of the divided rotors 12U, 12V and 12W are disposed without deviation of the electrical angle. However, as shown in FIG. 18C, it is possible to disposed the stator pawl magnetic poles 17a-2 of the phases without deviation of the electrical angle, and the rotor pawl magnetic poles 12b of the divided rotors 12U, 12V and 12W may be deviated from each other by the electrical angle of 120°.

Twelfth Embodiment

Figure 19A:
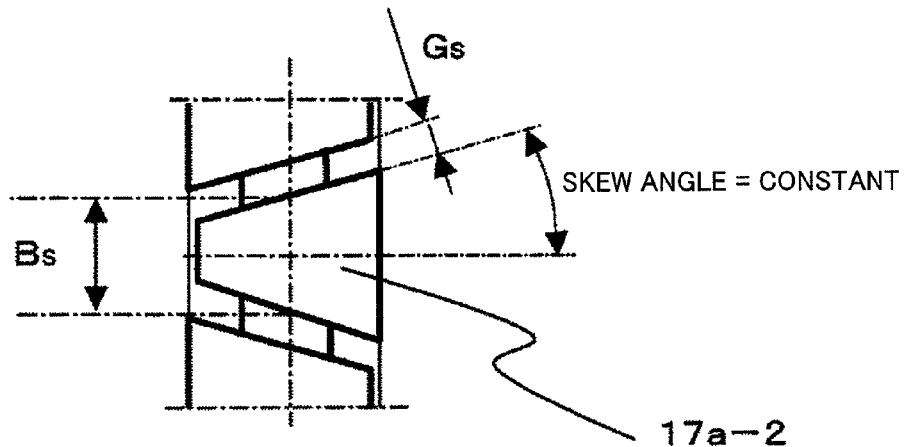
FIGS. 19A and 19B are a diagram showing a stator pawl magnetic pole in a twelfth embodiment and a graph showing a relation between induced voltage and a gap ratio between the stator pawl magnetic poles.
Figure 19B:
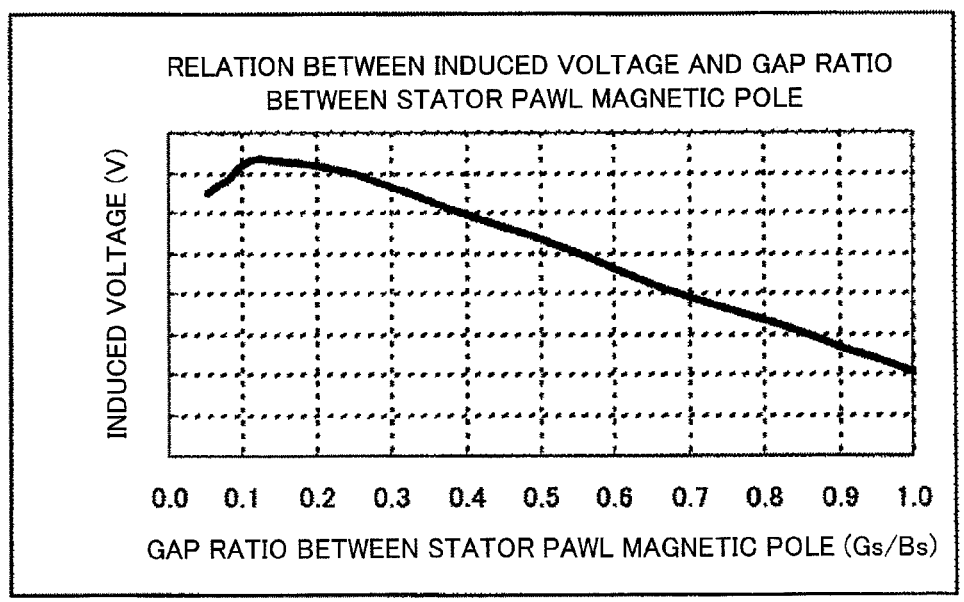

Next, a twelfth embodiment will be explained based on FIGS. 19A and 19B. FIG. 19A is a diagram showing a stator pawl magnetic pole in the twelfth embodiment. FIG. 19B is a graph showing a relation between the induced voltage and a gap ratio between the stator pawl magnetic poles. The same elements as those of the other embodiments are designated with the same name and the same symbols.

As shown in FIG. 19B, it was found that a gap ratio (Gs/Bs) between the stator pawl magnetic poles which was a ratio between a gap Gs between the stator pawl magnetic poles 17a-2 in the stator 17 and a circumferential width Bs at a substantially intermediate position of the stator pawl magnetic pole 17a-2 in the axial direction was changed, induced voltage to be output was changed. In FIG. 19B, the skew angel of the stator pawl magnetic pole 17a-2 is constant and the rotor is not changed.

According to FIG. 19B, if the gap ratio (Gs/Bs) between the stator pawl magnetic poles is set to 0.05 to 0.3, necessary induced voltage can be output. Especially the induced voltage reaches the peak when the gap ratio (Gs/Bs) between the stator pawl magnetic poles is about 0.15. Even if the gap ratio (Gs/Bs) between the stator pawl magnetic poles is increased or reduced from about 0.15, the induced voltage is reduced. Therefore, as apparent from FIG. 19B, if the gap ratio (Gs/Bs) between the stator pawl magnetic poles is set to 0.1 to 0.2, high voltage can be induced.

Thirteenth Embodiment

Figure 20A:
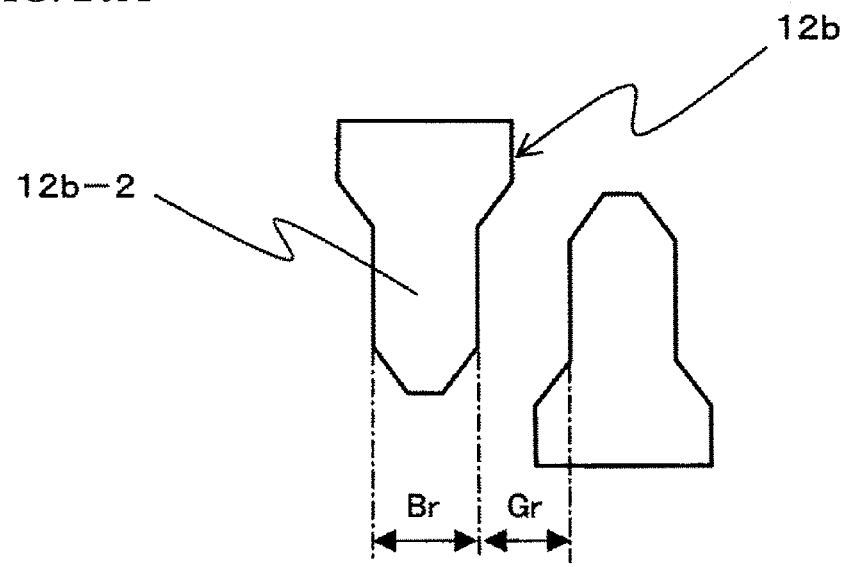
FIGS. 20A and 20B are a diagram showing a rotor pawl magnetic pole in a thirteenth embodiment and a graph showing a relation between induced voltage and gap ratio between rotor pawl magnetic pole.
Figure 20B:
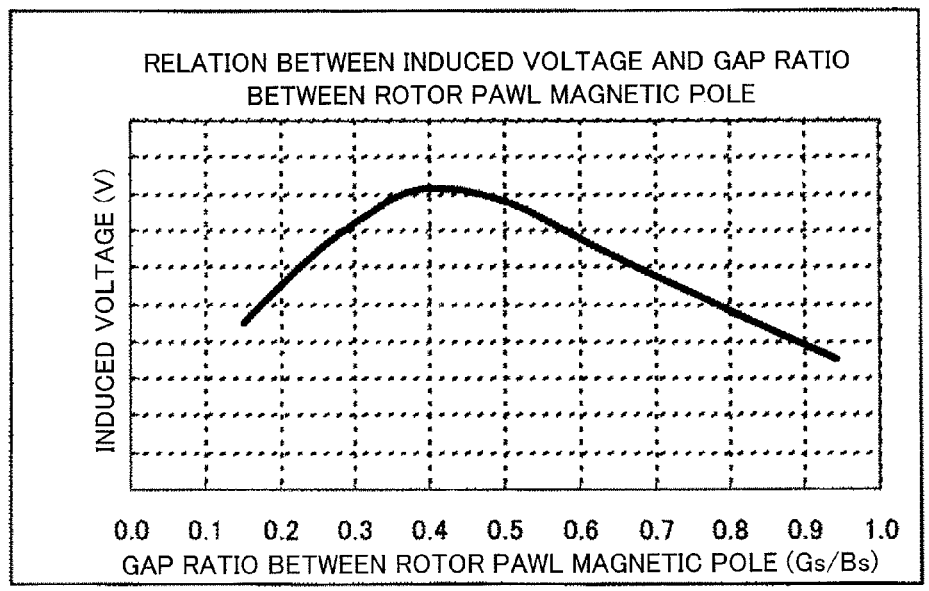

A thirteenth embodiment will be explained based on FIGS. 20A and 20B. FIG. 20A is a diagram showing the rotor pawl magnetic pole in the thirteenth embodiment. FIG. 20B is a graph showing a relation between induced voltage and gap ratio between rotor pawl magnetic poles. The same elements as those of the other embodiments are designated with the same name and the same symbols.

As shown in FIG. 20B, it was found that induced voltage to be output is varied by changing a gap ratio (Gr/Br) between the rotor pawl magnetic poles which is a ratio between the rotor pawl magnetic poles 12b in the rotor 12 and a circumferential width Br of the intermediate portion 12b-2 which is a substantially intermediate position in the rotor pawl magnetic pole 12b in the axial direction. In FIG. 20B, the stator is not changed.

According to FIG. 20B, by setting the gap ratio (Gr/Br) between the rotor pawl magnetic poles to 0.3 to 0.6, it is possible to output necessary induced voltage. Especially, the induced voltage reaches its peak when the gap ratio (Gr/Br) between the rotor pawl magnetic poles is about 0.4. Even if the gap ratio (Gr/Br) between the rotor pawl magnetic poles is increased or reduced from about 0.4, the induced voltage is reduced. Therefore, as apparent from FIG. 20B, if the gap ratio (Gr/Br) between the rotor pawl magnetic poles is set to 0.35 to 0.45, it is possible to induce higher voltage.

The gap ratio (Gr/Br) between the rotor pawl magnetic poles is changed without changing the stator side and the induced voltage is measured in the thirteenth embodiment. Even if the gap ratio (Gs/Bs) between the stator pawl magnetic poles is changed as in the twelfth embodiment, the tendency of induced voltage is almost the same as that of the gap ratio (Gr/Br) between the rotor pawl magnetic poles. Therefore, even if the stator is changed, if the gap ratio (Gr/Br) between the rotor pawl magnetic poles is within the above numerical range, the induced voltage can be enhanced. The same is applied to the twelfth embodiment. Even if the gap ratio (Gr/Br) between the rotor pawl magnetic poles is changed, the induced voltage tendency is almost the same as that of the gap ratio (Gs/Bs) between the stator pawl magnetic poles. From the above reason, if both the twelfth and thirteenth embodiments are satisfied, induced voltage can further be enhanced.

Fourteenth Embodiment

Figure 21A:
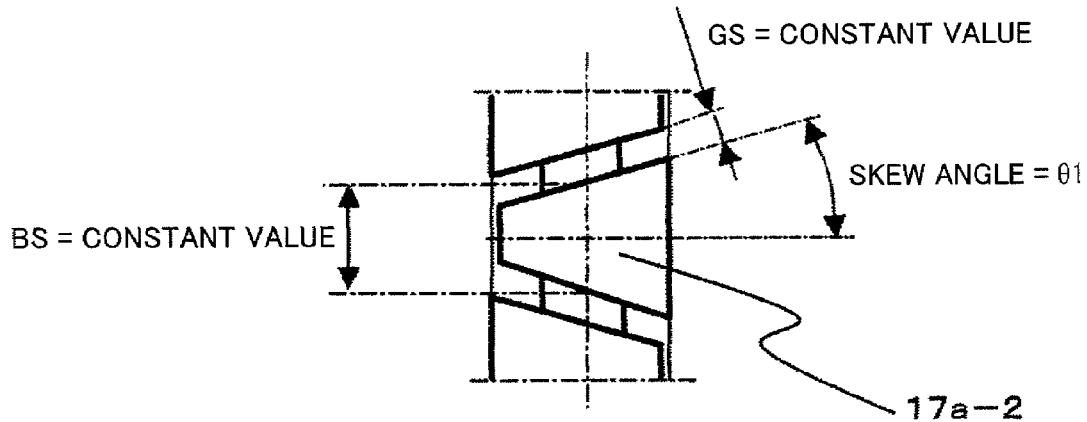
FIGS. 21A, 21B and 21C are a diagram showing a stator pawl magnetic pole in a fourteenth embodiment, a graph showing a relation between induced voltage and a skew angle of the stator pawl magnetic pole and a graph showing a relation between voltage amplitude and a skew angle of the stator pawl magnetic pole.
Figure 21B:
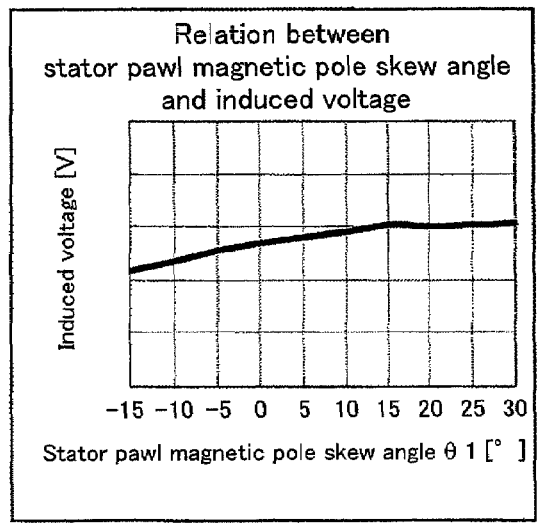
Figure 21C:
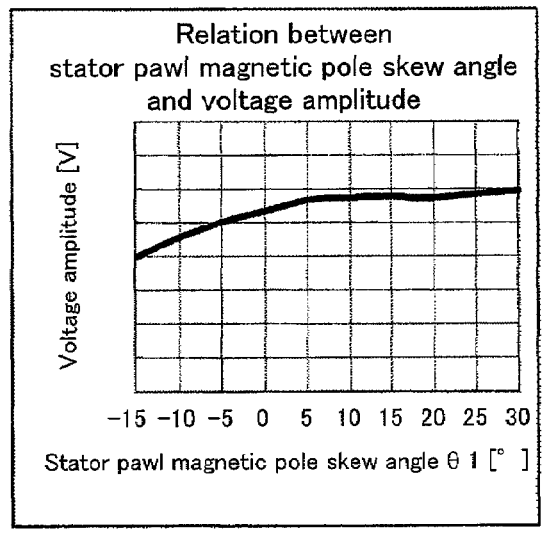

Next, a fourteenth embodiment will be explained based on FIGS. 21A, 21B and 21C. FIG. 21A is a diagram showing the stator pawl magnetic pole in the fourteenth embodiment. FIG. 21B is a graph showing a relation between a skew angle of the stator pawl magnetic pole and induced voltage. FIG. 21C is a graph showing a relation between the skew angle of the stator pawl magnetic pole and the voltage amplitude. The same elements as those of the other embodiments are designated with the same name and the same symbols.

As shown in FIG. 21B, it was found that if the skew angle θ1 of the stator pawl magnetic pole 17a-2 in the stator 17 is changed, induced voltage to be output is changed. In FIG. 21B, the circumferential width Bs of the stator pawl magnetic pole 17a-2 and the gap Gs between the stator pawl magnetic poles 17a-2 are made constant, and the rotor is not changed.

According to FIG. 21B, if the skew angle θ1 of the stator pawl magnetic pole 17a-2 is set to 5° or greater, necessary induced voltage can be output. If the skew angle θ1 becomes 15° or lower, the induced voltage starts lowering. According to FIG. 21C, if the skew angle θ1 of the stator pawl magnetic pole 17a-2 becomes 20° or higher, the voltage amplitude becomes excessively large and necessary induced voltage can not be output. From the above reason, if the skew angle θ1 of the stator pawl magnetic pole 17a-2 is set to 5° to 20°, necessary induced voltage can be output, and it is preferable that the skew angle θ1 is set to 15° to 20°.

Fifteenth Embodiment

Figure 22A:
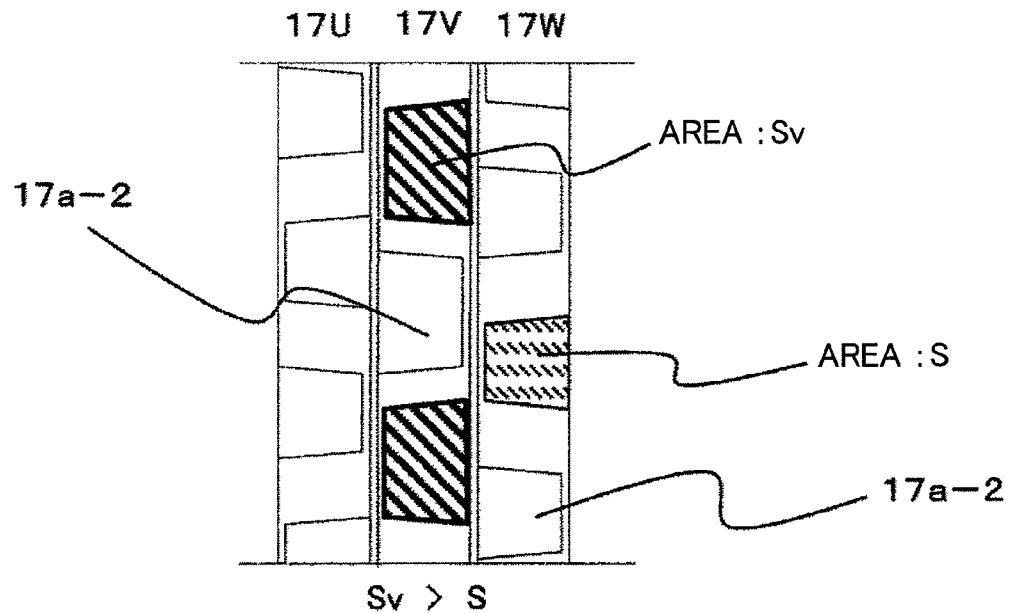
FIGS. 22A and 22C are diagrams showing a stator pawl magnetic pole in a fifteenth embodiment.
Figure 22B:
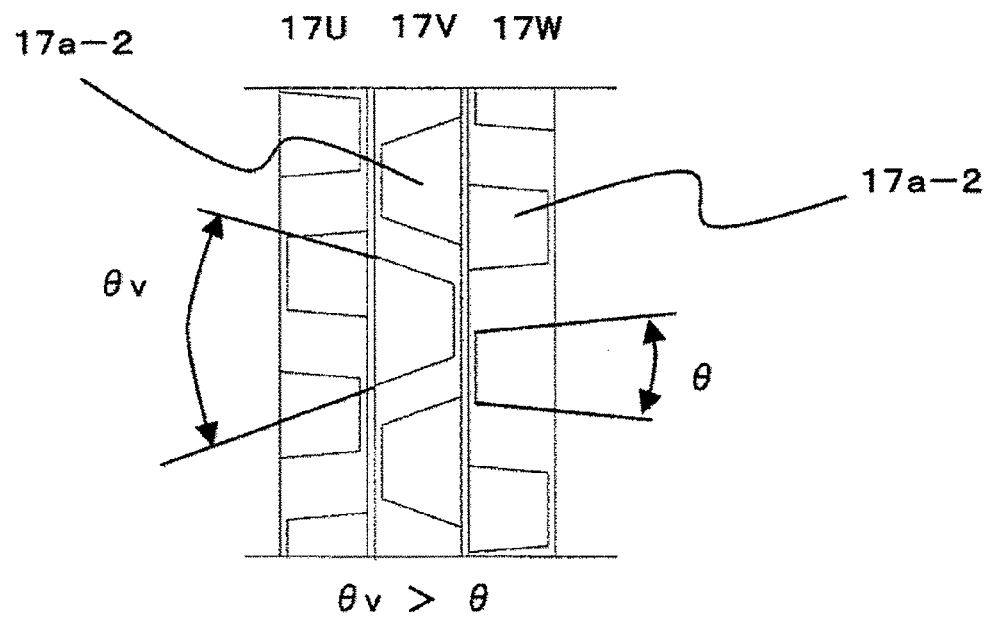

Next, a fifteenth embodiment will be explained based on FIGS. 22A and 22B. FIG. 22A is a diagram showing a shape of the stator pawl magnetic pole of the fifteenth embodiment. FIG. 22B is a diagram showing another shape of the stator pawl magnetic pole of the fifteenth embodiment. The same elements as those of the other embodiments are designated with the same name and the same symbols.

In the fifteenth embodiment, the shape of the stator pawl magnetic pole 17a-2 of the V-phase stator 17V is different from the shapes of the stator pawl magnetic poles 17a-2 of the U-phase stator 17U and the W-phase stator 17W. More specifically, as shown in FIG. 22A, the surface area Sv of stator pawl magnetic pole 17a-2 of the V-phase stator 17V is greater than surface area S of the stator pawl magnetic pole 17a-2 of each of the U-phase stator 17U and the W-phase stator 17W. With this structure, the induced voltage of the V-phase stator 17V can be enhanced, and the U-phase stator 17U and the W-phase stator 17W can be balanced. Thus, the shapes of the stator pawl magnetic poles 17a-2 constitute the balance means.

As shown in FIG. 22B, the skew angle θv of the stator pawl magnetic pole 17a-2 of the V-phase stator 17V is greater than the skew angle θ of the stator pawl magnetic pole 17a-2 of each of the U-phase stator 17U and the W-phase stator 17W. As shown in the fourteenth embodiment, there is a tendency that the skew angle of the stator pawl magnetic pole 17a-2 is increased as the induced voltage is increased. Therefore, the induced voltage of the V-phase stator 17V can be enhanced and the U-phase stator 17U and the W-phase stator 17W can be balanced. Thus, the shapes of the stator pawl magnetic poles 17a-2 constitute the balance means.

The shapes of the stator pawl magnetic poles in phases disposed o the both ends in the axial direction and in a phase other than the former phases are made different from each other and the balance means is constituted. With this voltage induced by the stators of the phases can be balanced.

Sixteenth Embodiment

Figure 23A:
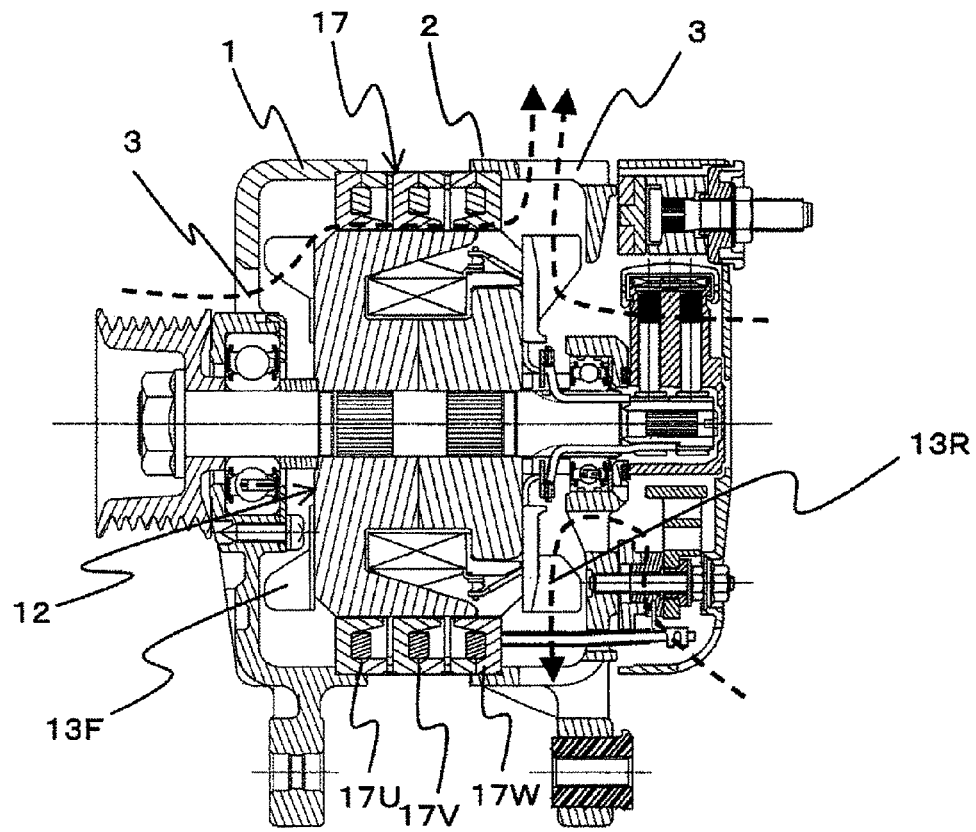
FIGS. 23A and 23B are a side sectional view of a vehicular AC power generator as one embodiment of a rotating electrical machine in a sixteenth embodiment, and a diagram showing a stator pawl magnetic pole.
Figure 23B:
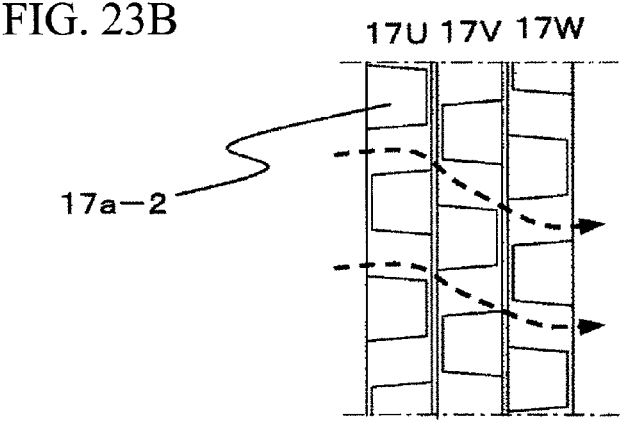

Next, a sixteenth embodiment will be explained based on FIGS. 23A and 23B. FIG. 23A is a side sectional view of a vehicular AC power generator according to one embodiment of the rotating electrical machine of the sixteenth embodiment. FIG. 23B is a diagram showing a stator pawl magnetic pole in the sixteenth embodiment. The same elements as those of the other embodiments are designated with the same name and the same symbols.

The sixteenth embodiment is different from the first embodiment in the front bracket 1, the rear bracket 2 and the stator 17, but other portions are substantially the same as those of the first embodiment and thus, explanation thereof will not be described.

As shown in FIG. 23A, the front bracket 1 in the sixteenth embodiment is different in that a thickness thereof on the side of the outer periphery in the radial direction and a thickness thereof on the side of the bottom are substantially the same, and the ventilation holes 3 is not formed in the outer periphery. The front bracket 1 and the rear bracket 2 are not fitted to each other, and they do not extend to the bracket of the mating member. Therefore, in the front bracket 1, the U-phase stator 17U is an open end edge, and in the rear bracket 2, the W-phase stator 17W is an open end edge.

According to the stator 17 of the sixteenth embodiment, resin is not charged into a gap formed between the stator pawl magnetic poles 17a-2, it is sandwiched between the front bracket 1 and the rear bracket 2 in the axial direction and the stators 17 of the phases are connected and fixed. As shown in FIG. 23B, since the stator pawl magnetic pole 17a-2 is provided with the skew, the gap between the stator pawl magnetic poles 17a-2 is continuous in the axial direction to the U-phase stator 17U, the V-phase stator 17V and the W-phase stator 17W.

With this structure, if the front fan 13F rotates as shown with the broken line arrow in FIG. 23A. Air is introduced from the ventilation holes 3 in the inner periphery of the front bracket 1 and the air flows toward the outer periphery by a centrifugal force. However, since the ventilation holes 3 in the outer periphery in the front bracket 1 is sealed, the air can not flow toward the outer periphery. Therefore, the air flows through the gap which formed between the stator pawl magnetic poles 17a-2 and which is continuous in the axial direction, and the air merges with air flowing toward the outer periphery by the rotation of the rear fan 13R. The air is discharged from the ventilation holes 3 formed in the outer periphery in the rear bracket 2. Since air flowing through the gap formed between the stator pawl magnetic poles 17a-2 is increased, and the stator 17 and the rotor 12 can sufficiently be cooled. The blade of the front fan 13F in the sixteenth embodiment is smaller than a blade of the rear fan 13R like the first embodiment, and an amount of flowing air is also small. Therefore, it is possible to increase the amount of air flowing through the gap between the stator pawl magnetic poles 17a-2.

Seventeenth Embodiment

Figure 24:
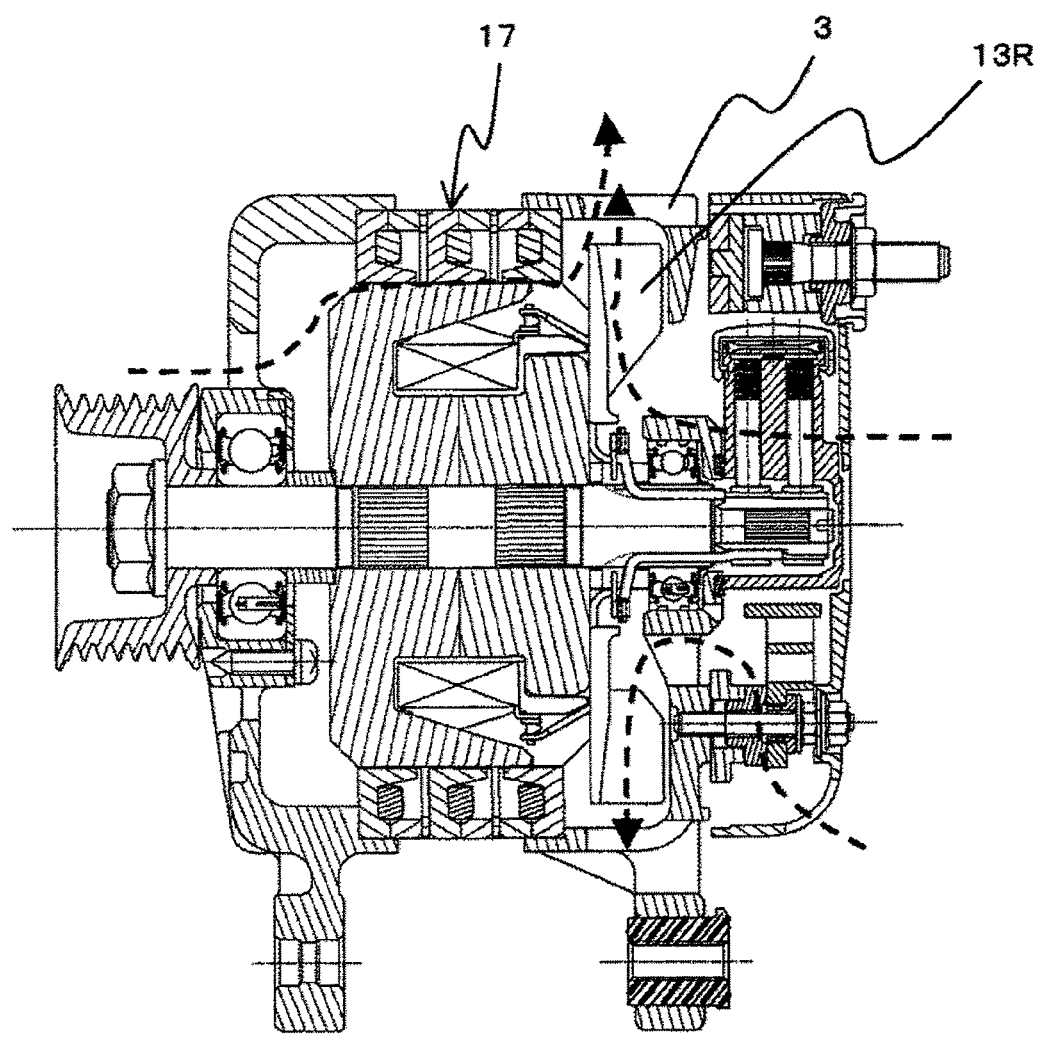
FIG. 24 is a side sectional view of a vehicular AC power generator as one embodiment of a rotating electrical machine in a seventeenth embodiment.

Next, a seventeenth embodiment will be explained based on FIG. 24. FIG. 24 is a side sectional view of a vehicular AC power generator which is one embodiment of a rotating electrical machine in the seventeenth embodiment. The same elements as those of the other embodiments are designated with the same name and the same symbols.

The seventeenth embodiment is different from the sixteenth embodiment in that the front fan 13F is not provided. Further, the outer diameter of the rear fan 13R is closer to the outer periphery than the inner periphery of the stator 17 and is greater than the inner periphery of the stator 17. However, other portions of the seventeenth embodiment are substantially the same as those in the sixteenth embodiment and thus, explanation thereof will not be described.

As shown in FIG. 24, since the front fan 13F is not provided in the seventeenth embodiment, air flow is generated only by the rear fan 13R. Since the outer peripheral end of the blade of the rear fan 13R is closer to the outer periphery than the inner periphery of the stator 17. Therefore, as shown with the broke line arrow, when air flows from the inner periphery side toward the outer periphery side by a centrifugal force, air is sucked also from the front bracket 1 through a gap between the rotor 12 and the stator 17 opposed to the blade. Thus, the stator 17 can sufficiently be cooled even if there is only the rear fan 13R. Since the front fan 13F is omitted, it is possible to provide the apparatus inexpensively.

In each of the sixteenth and seventeenth embodiments, the gap through which air flows is provided between the stator pawl magnetic poles, and the gap is continuous from one end to the other end of the stator core in the axial direction. Thus, even if there are not coil ends on the both ends in the axial direction, the stator can sufficiently be cooled. There is provided ventilation means for flowing air in the axial direction for the gap, it is possible to cool the stator more effectively.

Eighteenth Embodiment

Figure 25:
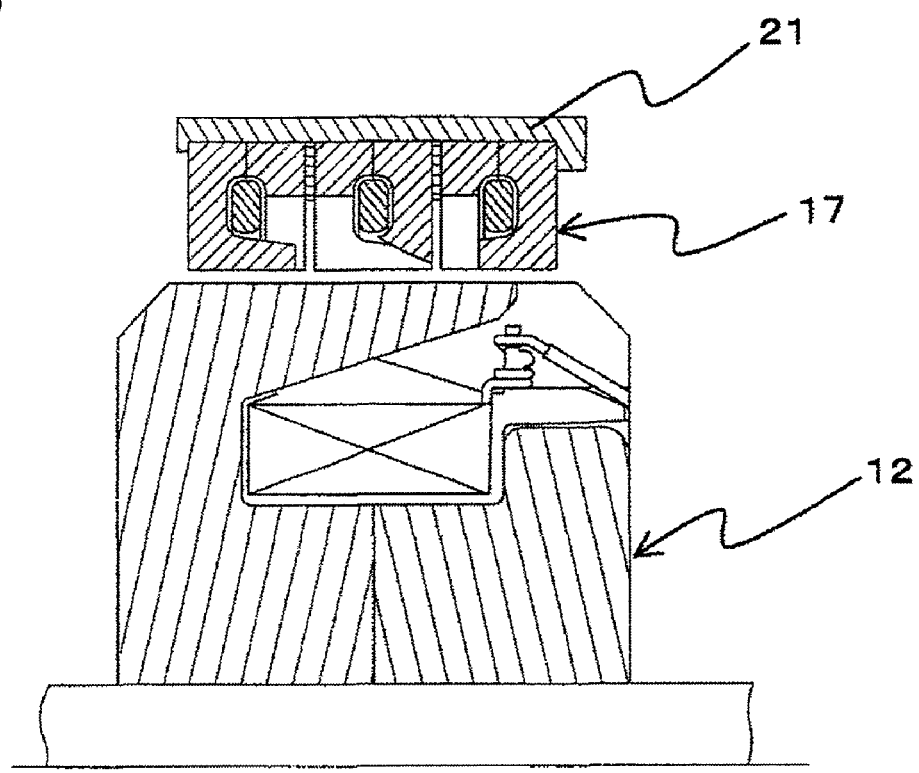
FIG. 25 is a side sectional view of a rotor and a stator in an eighteenth embodiment.

Next, an eighteenth embodiment will be explained based on FIG. 25. FIG. 25 is a side sectional view of a rotor and a stator in the eighteenth embodiment. The same elements as those of the other embodiments are designated with the same name and the same symbols.

In each of the fifteenth and sixteenth embodiments, the stator 17 is sandwiched between the front bracket 1 and the rear bracket 2 from the axial direction and fixed. In the eighteenth embodiment, as shown in FIG. 25, the stator 17 of each phase is provided, over its outer periphery, with a non-magnetic reinforcing ring 21 made of aluminum alloy, thereby integrally forming the stator 17 of the each phase. According to the reinforcing ring 21, a ring having a substantially L-shaped cross section is fitted over an outer periphery of the stator 17. One end of the ring in the axial direction extends toward the inner periphery. The other end is swaged and folded toward the inner periphery. Therefore, in a state where the reinforcing ring 21 is fixed to the stator 17, the cross section assumes a substantially U-shape. The reinforcing ring 21 need not be made of non-magnetic material, and may be made of magnetic material.

By providing the reinforcing ring 21, before the stator 17 is sandwiched between the front bracket 1 and the rear bracket 2, they can be unitized. This facilitates the assembling operation. The strength can be reinforced so that the stator core 17a which is made of low strength dust core is not deformed when it is sandwiched between the front bracket 1 and the rear bracket 2, and resistance to vibration can also be enhanced.

Although the embodiments of the present invention have been explained above, other structures which can also be employed will be described below.

In the embodiments, the vehicular AC power generator is explained as one embodiment of the rotating electrical machine. However, the present invention can also be applied to a motor which outputs a rotation force and to a motor generator which generates electricity and drives. Examples of the motor include a motor for driving a hybrid car or electric four-wheel drive vehicle, and a motor for driving a pump.

In the first embodiment, the thickness of only the front bracket 1 on the outer periphery portion in the radial direction is thicker than the thickness of the bottom thereof. However, if a disposition space is secured, the thickness of the rear bracket 2 on the outer peripheral portion in the radial direction may be thicker than the thickness of the bottom thereof like the front bracket 1. With this structure, the cooling effect of the stator 17 can be enhanced. If an inner peripheral surface of the ventilation holes 3 on the side of the outer periphery in the radial direction opposed to the steps 16F and 16R fitted to the ends of the stators 17 of the brackets in the axial direction are provided with a fin or convex and concave portions, the heat radiation area is increased and the cooling effect can further be enhanced.

In the first embodiment, the rotor pawl magnetic pole 12b is formed in the root portion 12b-1, the intermediate portion 12b-2 and the tip end 12b-3, but a portion from the root portion 12b-1 to the tip end 12b-3 may be inclined continuously. The width from the root portion 12b-1 to the tip end 12b-3 may be the same in the circumferential direction. The outer peripheral surface of the rotor pawl magnetic pole 12b may be provided with a plurality of grooves in the circumferential direction for preventing eddy current.

In the first embodiment, the three phase stator 17 is explained but three or more phases may be employed. When the number of phases is changed, the phase is not the electrical angle of 120°, and it is necessary to change the angle in accordance with the number of phases.

In the first embodiment, the cross section shape of one line in the stator winding 17b is not specified, and the cross section may be circular or rectangular. To enhance the ratio of occupied area of the stator winding 17b in the stator core 17a, it is preferable that the cross section of the stator winding 17b is rectangular, and the cross section may be rectangular or square. When the cross section of the stator winding 17b is rectangular, the disposition shape of the stator winding 17b in the stator core 17a should be rectangular also.

In the first embodiment, the stator core 17a is provided with the concave portion 171 and the connection plate 18 is provided with the convex portion 181 to position the stator core 17a and the connection plate 18 of each phase in the circumferential direction. However, the positioning can be carried out using a jig or a mark even if the concave portion 171 and the convex portion 181 are not used. If the stator core 17a is not provided with the concave portion 171, a location where the magnetic path area is reduced is eliminated.

In the first embodiment, resin is charged into only the gap between the stator pawl magnetic poles 17a-2 to fix the stator 17 of each phase, but the entire stator 17 can be molded using non-magnetic material such as resin. If the entire stator 17 is molded in this manner, each phase can be made integrally, and the resistance to vibration and the strength of the dust core having low strength is enhanced. At that time, it is preferable that the inner periphery side of the stator pawl magnetic pole 17a-2, i.e., a portion thereof opposed to the rotor 12 is not molded so that the gap between the rotor 12 and the stator pawl magnetic pole 17a-2 is not increased in size.

In the first embodiment, the skews are provided on both sides of the stator pawl magnetic pole 17a-2 in the circumferential direction to form the substantially trapezoidal shape.

However, since the rotation direction of the rotor 12 is one direction, the skew may be provided only on the direction opposite from the rotation direction of the rotor 12 for reducing the magnetic noise. If the skew is provided only one side of the stator pawl magnetic pole 17*a*-2, it is possible to reduce the magnetic noise and to increase the area of the stator pawl magnetic pole 17*a*-2 opposed to the rotor 12. Therefore, a magnetic flux is easily formed between the stator 17 and the rotor 12 and the induced voltage can be increased.

In the second to fourth embodiments, the ferrite magnet is employed as the permanent magnet 19 disposed between the rotor pawl magnetic poles 12*b*, but neodymium (Nd) powder may be bound by a binder in which precursor has excellent compatibility. Here, a precursor having excellent compatibility is alkoxysiloxane or alkoxysilane which is a precursor of $SiO_2$. The neodymium (Nd) powder has a plate-like shape, and the size in the X axis or Y axis is several times greater than a value in the Z axis which is a height direction. Thickness of the neodymium (Nd) power is thin. It is preferable that the X axis or Y axis size of the neodymium (Nd) powder is greater, and if neodymium (Nd) powder having size in X axis or Y axis of 45 μmeter or greater is used, residual characteristics are enhanced. The neodymium (Nd) powder may be broken and divided during forming, small powder may be mixed, but it is preferable that half or more of the powder has 45 μmeter or greater. Further, 70% or more of the powder has size of 45 μmeter or greater, more preferable magnetic characteristics can be obtained. If 90% or more of the powder has size of 45 μmeter or greater, more preferable result can be obtained. If the neodymium (Nd) includes slight dysprosium (Dy), heat resistance is enhanced. If the dysprosium (Dy) is included, even if the temperature of the rotating electrical machine is increased, excellent magnetic characteristics are maintained. A ratio of content of the dysprosium (Dy) is about several % and 10% at most. If a magnet in which $SiO_2$ is coupled to the neodymium powder is used, it is possible to inexpensively enhance the magnetic characteristics and heat resistance. If a magnet in which $SiO_2$ is coupled to the neodymium (Nd) powder is used, since the shape can freely be formed, it is possible to smoothly form the angle of the permanent magnet in the third and fourth embodiments. With this, it is possible to form the permanent magnet suitably for the leakage magnetic flux.

Although the fifth embodiment has the three phase stator 17, when a stator 17 having three or more phases is provided, the axial length should be narrowed toward the both ends in the axial direction from the stator 17 disposed at the central portion in the axial direction. With this, the stator 17 of each phase has an axial length suitable for the leakage magnetic flux.

In the sixth embodiment also, the stator 17 of three phases is explained, but when a stator 17 having three or more phases is provided, it is preferable that the winding times of the stator winding 17*b* is reduced toward the both ends in the axial direction from the stator 17 disposed at the central portion in the axial direction. With this, the stator 17 of each phase has winding times of the stator winding 17*b* suitable for the leakage magnetic flux.

In the seventh embodiment, concerning the gaps in the radial direction between the rotor pawl magnetic pole 12*b* and the stator 17 of each phase, the outer surface of the rotor pawl magnetic pole 12*b* of the rotor 12 is changed so that the gap a at the location opposed to the V-phase stator 17V is narrow and the gap b at the location opposed to the U-phase stator 17U and the W-phase stator 17W is wide. However, it is possible to adjust the gap by increasing the diameter of the inner and outer peripheries of the U-phase stator 17U and the W-phase stator 17W greater than the V-phase stator 17V.

In the eighth embodiment, the pairs of stators 17 of the U-phase, V-phase and W-phase are provided, they may be provided three each. Since it is only necessary that the induced voltage values of the U-phase, V-phase and W-phase are balanced, their disposition order can appropriately be changed.

In the ninth embodiment, resin is charged between the stators 17 of the phases, but a thick connection plate 18 may be disposed like the first embodiment. At that time, since the connection plate 18 is thick, a concave portion may be provided instead of the positioning convex portion 181.

In the tenth embodiment, the insulation groove 20 having the rectangular cross section is provided, but the insulation groove 20 need not have the rectangular cross section, the shape of the cross section may be V-shape, trapezoidal shape or semicircular shape.

In the eleventh embodiment, an interphase pitch between the phases of one of the stator pawl magnetic pole 17*a*-2 and the rotor pawl magnetic pole 12*b* becomes 0°, and the other interphase pitch is 120°. However, since the phases are independent from each other, if the relative positions of the stator pawl magnetic pole 17*a*-2 and the rotor pawl magnetic pole 12*b* are correct, it does not matter wherever they are located.

In the sixteenth and seventeenth embodiments, the fan for flowing air from the inner periphery to the outer periphery by a centrifugal force is used°°.. However, it is possible to provide a an axial fan instead of the front fan 13F to flow air in the axial direction. If the angle portion of the tip end of the stator pawl magnetic pole 17*a*-2 is chamfered or rounded, resistance of air flowing through the gap between the stator pawl magnetic poles 17*a*-2 of the phases can be reduced by attaching an R and the cooling effect is enhanced. In addition, a fin increasing the heat radiation area may be provided on the air flow portion of the stator 17.

In the eighteenth embodiment, the reinforcing ring 21 is fixed by swaging, but an outer periphery of the stator 17 may be molded as a reinforcing ring. At that time, it is preferable that a high hard material capable of withstanding an axial force is used as the molding material. If the reinforcing ring is provided with a cooling fin, the cooling effect can further be enhanced.

Next, inventions which are described in claims which can be grasped from the embodiments will be described together with effects thereof.

(1) The rotating electrical machine according to claim 1, wherein the stator includes the stator core and the stator winding of three or more phases arranged in the axial direction, and the rotating electrical machine further includes balance means for balancing voltage induced in a phase other than phases disposed on the both ends in the axial direction and voltage induced in the other phase.

(2) The rotating electrical machine according to (1), wherein the balance means is means for increasing voltage induced in a phase other than those disposed on the both ends in the axial direction.

(3) The rotating electrical machine according to (2), wherein the balance means is a permanent magnet provided between the rotor pawl magnetic poles and at least provided so as to be opposed to a phase other than those disposed on the both ends in the axial direction.

(4) The rotating electrical machine according to (3), wherein the permanent magnet is provided only on a portion opposed to a phase other than those disposed on the both ends in the axial direction.

(5) The rotating electrical machine according to (3), wherein the permanent magnet is constituted such that a magnetic force thereof at a location opposed to phases disposed on both ends in the axial direction is weaker than a magnetic force at a location opposed to a phase other than the phases disposed on both ends in the axial direction.

(6) The rotating electrical machine according to (5), wherein both ends of the permanent magnet in the axial direction are thin.

(7) The rotating electrical machine according to (1), wherein the balance means functions such that a magnetic flux passing between the rotor and phases disposed on both ends in the axial direction passes more difficult than a magnetic flux passing between the rotor and a phase other than the phases disposed on both ends in the axial direction.

(8) The rotating electrical machine according to (7), wherein an axial length of each of the stator cores disposed on both ends in the axial direction is shorter than an axial length of a stator core other than the stator cores disposed on both ends in the axial direction.

(9) The rotating electrical machine according to (7), wherein a gap between the rotor and stator pawl magnetic poles of the stator cores disposed on both ends in the axial direction is greater than a gap between the rotor and a stator pawl magnetic pole of a stator core other than those disposed on both ends in the axial direction.

(10) The rotating electrical machine according to (1), wherein the balance means is constituted by reducing winding times of a stator winding of phases disposed on both ends in the axial direction than winding times of a stator winding of a phase other than the phases disposed on both ends in the axial direction.

(11) The rotating electrical machine according to (1), wherein in the balance means, a shape of the stator pawl magnetic pole in phases disposed on both ends in the axial direction and a shape of a stator pawl magnetic pole in a phase other than the phases disposed on both ends in the axial direction are different from each other.

(12) The rotating electrical machine according to (1), wherein the stator includes the stator core and the stator winding of a plurality of phases arranged in the axial direction, and a plurality of sets of the phases are provided, the phases being arranged such that the same phase comes on the same order from one end in the axial direction, the stator windings on the same phase being connected in series.

(13) The rotating electrical machine according to claim 1, wherein the stator is sandwiched between brackets in the axial direction, and at least one end in the axial direction abuts against the bracket at a location closer to an inner periphery of the stator winding than an outer periphery thereof, a ventilation hole through which air can flow being provided at a portion of the bracket which abuts against the stator and a portion opposed to the former portion, and the rotating electrical machine further including ventilation means for sending air through the ventilation hole. With this structure, since the stator windings do not project to the both sides of the stator core in the axial direction, the bracket can extend to a location closer to the inner periphery than the outer periphery of the stator winding. Therefore, the stator can sufficiently be cooled even if there is no coil end.

(14) The rotating electrical machine according to (13), wherein the ventilation hole is provided with a cooling fin. With this structure, the cooling effect of the stator can further be enhanced.

(15) The rotating electrical machine according to (13), wherein the bracket is divided into a cup-like front bracket and a rear bracket, and the stator is sandwiched between the front bracket and the rear bracket in a state where the front bracket and the rear bracket are in contact with each other. With this structure, heat can be exchanged between the front bracket and the rear bracket, and the entire range of the stator can be cooled.

(16) The rotating electrical machine according to claim 1, wherein the stator includes a plurality of phases of the stator core and the stator winding, and a non-magnetic connection plate is provided between the stator cores of the phases. With this structure, it is possible to reliably reduce leakage of magnetic flux of each interphase.

(17) The rotating electrical machine according to (16), wherein the stator core and the connection plate of the phase are provided with a positioning portion for positioning them in the circumferential direction. With this structure, it is possible to reliably position the stator core of each phase in the circumferential direction.

(18) The rotating electrical machine according to claim 1, wherein the stator core includes two stator core constituent members which are divided in the axial direction, and the stator core constituent members have the same shape. With this structure, it is unnecessary to produce different kinds of stator core constituent members, and the machine can be produced inexpensively. (19) The rotating electrical machine according to (1), wherein the balance means is a groove or a layer made of non-magnetic material provided in the circumferential direction in or on a portion of the rotor opposed between the adjacent stator cores. With this structure, it is possible to reduce the leakage of magnetic flux using a surface of the rotor as a path and thus, the induced voltage can be balanced.

(20) The rotating electrical machine according to (1), wherein the balance means is constituted by dividing such that the rotors independently function in a portion opposed between the adjacent stator cores. With this structure, since a magnetic circuit is constituted independently for each phase and thus, induced voltage can be balanced.

(21) The rotating electrical machine according to claim 1, wherein the stator includes a plurality of phases of the stator core and the stator winding, and outer peripheries of the stator cores are integrally formed together by means of a non-magnetic material. With this structure, it is possible to form a gap between the stator pawl magnetic poles through which air can flow, and the stator cores can be integrally formed together.

(22) The rotating electrical machine according to (21), wherein the non-magnetic material provided on the side of the outer periphery of the stator core is an annular reinforcing ring made of metal. With this structure, even if the stator core is made of dust core, the strength can be enhanced.

What is claimed is:

1. A rotating electrical machine in which a rotor relatively rotates with respect to a stator, wherein:

said rotor includes a field winding wound around a rotation shaft, and a rotor core which surrounds the field winding and which includes a rotor pawl magnetic pole at a portion of said rotor, said stator includes a stator winding which is annularly wound around an outer periphery of said rotor, and a stator core which includes stator pawl magnetic poles alternately extending from axially both sides of a portion of said stator opposed to said rotor, and which surrounds a periphery of said stator winding, wherein said stator includes a plurality of phases of said stator core and said stator winding, and connection plates made of a non-magnetic material are interposed between said plurality of phases, and wherein said stator core of each phase includes a pair of stator cores, and said stator winding of each phase is surrounded by said pair of stator cores and said stator pawl magnetic poles extending axially alternately from said pair of stator cores.

2. The rotating electrical machine according to claim 1, wherein said stator pawl magnetic poles include a skew angle of 0 to 20° with respect to an axial direction line.

3. The rotating electrical machine according to claim 1 wherein said stator pawl magnetic poles include a skew angle of 5 to 20° with respect to an axial direction line.

4. The rotating electrical machine according to claim 1 wherein said stator pawl magnetic poles include a skew angle of 15 to 20° with respect to an axial direction line.

5. The rotating electrical machine according to claim 1, wherein a gap through which air passes is provided between the stator pawl magnetic poles, and the gap is continuous from one end to the other end of the stator core in its axial direction.

6. The rotating electrical machine according to claim 1, wherein, stator windings of the phases extend toward one end of the stator in its axial direction through a gap between said stator pawl magnetic poles.

7. The rotating electrical machine according to claim 1, wherein, said non-magnetic material is continuously charged into a gap between said stator pawl magnetic poles and connected.

8. The rotating electrical machine according to claim 1, further comprising ventilating means for flowing air through a gap between said rotor and said stator in the axial direction.

9. The rotating electrical machine according to claim 1, wherein said stator includes three phases each having said stator core and said stator winding, and an axial length of said stator core of a gap/one phase of interphase in said stator core is 0.05 to 0.2.

10. The rotating electrical machine according to claim 9, wherein an axial length of said stator core of a gap/one phase of interphase in said stator core is 0.07 to 0.15.

11. The rotating electrical machine according to claim 10, wherein an axial length of said stator core of a gap/one phase of interphase in said stator core is 0.1 to 0.13.

12. The rotating electrical machine according to claim 1, wherein a root portion of said rotor pawl magnetic pole is wider than an intermediate portion, said intermediate portion being wider than a tip end, and said intermediate portion having a substantially constant width.

13. A rotating electrical machine in which a rotor relatively rotates with respect to a stator, comprising
a Lundell type rotor having a field winding and 12 to 24 magnetic poles, and
a stator including a stator core provided at a location opposed to an outer periphery of the rotor and a stator winding wound in the stator core,
wherein:
said stator winding is annularly wound around the outer periphery of said rotor, and
said stator core includes stator pawl magnetic poles extending from both sides in the axial direction at locations opposed to said rotor,
wherein said stator includes a plurality of phases of said stator core and said stator winding, and connection plates made of a non-magnetic material are interposed between said plurality of phases, and
wherein said stator core of each phase includes a pair of stator cores, and said stator winding of each phase is surrounded by said pair of stator cores and said stator pawl magnetic poles extending axially alternately from said pair of stator cores.

14. The rotating electrical machine according to claim 13, wherein the number of stator pawl magnetic poles of said stator is in a range of 12 to 24.

15. The rotating electrical machine according to claim 13, wherein the number of magnetic poles of said rotor and the number of stator pawl magnetic poles of said stator are the same.

16. The rotating electrical machine according to claim 15, wherein the number of magnetic poles of said rotor and the number of stator pawl magnetic poles of said stator are 16.

17. A rotating electrical machine in which a rotor relatively rotates with respect to a stator, comprising
a Lundell type rotor having a field winding and a plurality of rotor pawl magnetic poles, and
a stator including a stator core provided at a location opposed to an outer periphery of the rotor and a stator winding wound in the stator core, wherein:
said stator winding is annularly wound around the outer periphery of said rotor, said stator core includes stator pawl magnetic poles extending from both sides in the axial direction at locations opposed to said rotor, and a width of said stator pawl magnetic pole at a substantially center position in the axial direction/a width of a gap between said stator pawl magnetic poles is in a range of 0.05 to 0.3.

18. The rotating electrical machine according to claim 17, wherein the width of said stator pawl magnetic pole at a substantially center position in the axial direction/the width of a gap between said stator pawl magnetic poles is in a range of 0.1 to 0.2.

19. The rotating electrical machine according to claim 18, wherein the width of said rotor pawl magnetic pole at a substantially center position in the axial direction/the width of a gap between said rotor pawl magnetic poles is in a range of 0.3 to 0.6.

20. The rotating electrical machine according to claim 19, wherein the width of said rotor pawl magnetic pole at a substantially center position in the axial direction/the width of a gap between said rotor pawl magnetic poles is in a range of 0.35 to 0.45.

* * * * *